(12) United States Patent
Iwasaki

(10) Patent No.: US 8,897,373 B2
(45) Date of Patent: *Nov. 25, 2014

(54) MOVING IMAGE DISTRIBUTION SERVER, MOVING IMAGE REPRODUCTION APPARATUS, CONTROL METHOD, AND RECORDING MEDIUM

(71) Applicant: Square Enix Holdings Co., Ltd., Tokyo (JP)

(72) Inventor: Tetsuji Iwasaki, Montreal (CA)

(73) Assignee: Square Enix Holdings Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,604

(22) Filed: Aug. 16, 2013

(65) Prior Publication Data

US 2013/0335523 A1 Dec. 19, 2013

Related U.S. Application Data

(63) Continuation of application No. PCT/JP2013/002340, filed on Apr. 4, 2013.

(30) Foreign Application Priority Data

Apr. 12, 2012 (JP) .................................. 2012-091357

(51) Int. Cl.
*H04N 7/12* (2006.01)
*H04N 19/176* (2014.01)
(Continued)

(52) U.S. Cl.
CPC ...... *H04N 13/0048* (2013.01); *A63F 2300/538* (2013.01); *H04N 19/00278* (2013.01);
(Continued)

(58) Field of Classification Search
CPC ........................................................ H04N 7/50
USPC ..................................................... 375/240.24
See application file for complete search history.

(56) References Cited

U.S. PATENT DOCUMENTS 5,742,289 A 4/1998 Naylor et al.
6,741,259 B2 * 5/2004 Baker et al. .................. 345/582
(Continued)

FOREIGN PATENT DOCUMENTS

EP 1364535 11/2003
EP 1641278 3/2006
(Continued)

OTHER PUBLICATIONS

U.S. Appl. No. 13/817,171 to Tetsuji Iwasaki, filed Feb. 15, 2013.
(Continued)

*Primary Examiner* — Sath V Perungavoor
*Assistant Examiner* — James Pontius
(74) *Attorney, Agent, or Firm* — Greenblum & Bernstein, P.L.C.

(57) ABSTRACT

Rendering processing is performed such that a distribution screen is rendered in rendering processing of a subsequent stage by referring to a Depth map generated by rendering processing of a preceding stage. A moving image distribution server selects the Depth map for coding determination during execution of rendering processing of the subsequent stage for a first screen, and determines for each set block whether to perform inter-frame coding by referring to a Depth map generated for a second screen rendered before the first screen. After rendering processing of the subsequent stage has ended for the first screen, the server performs coding in accordance with the determination result and sends the coded moving image data to an external device. The determination result is sent to the external device before generation of the coded moving image data of the first screen is completed.

12 Claims, 13 Drawing Sheets

(51) Int. Cl.
*H04N 19/107* (2014.01)
*H04N 19/61* (2014.01)
*A63F 13/30* (2014.01)
*G06T 15/20* (2011.01)
*H04N 13/00* (2006.01)
*H04N 19/597* (2014.01)
*H04N 19/44* (2014.01)
*H04N 19/162* (2014.01)
*H04N 19/172* (2014.01)
*H04N 19/137* (2014.01)

(52) U.S. Cl.
CPC ...... *H04N 19/0003* (2013.01); *H04N 19/00533* (2013.01); *H04N 7/50* (2013.01); *H04N 19/0023* (2013.01); *A63F 13/12* (2013.01); *H04N 19/00266* (2013.01); *G06T 15/205* (2013.01); *H04N 19/00781* (2013.01); *H04N 19/00769* (2013.01); *H04N 19/00145* (2013.01)
USPC .................................................. 375/240.24

(56) References Cited

U.S. PATENT DOCUMENTS

| | | | |
|---|---|---|---|
| 6,868,191 B2* | 3/2005 | Nister | 382/285 |
| 6,975,329 B2* | 12/2005 | Bastos et al. | 345/587 |
| 7,558,428 B2 | 7/2009 | Shen et al. | |
| 7,813,570 B2 | 10/2010 | Shen et al. | |
| 7,894,525 B2 | 2/2011 | Piehl et al. | |
| 8,154,553 B2 | 4/2012 | Peterfreund | |
| 8,264,493 B2 | 9/2012 | Peterfreund | |
| 8,447,141 B2* | 5/2013 | Barenbrug | 382/298 |
| 8,599,403 B2* | 12/2013 | Redert et al. | 358/1.15 |
| 2004/0012600 A1* | 1/2004 | Deering et al. | 345/506 |
| 2004/0095999 A1 | 5/2004 | Piehl et al. | |
| 2005/0237323 A1 | 10/2005 | Shimamura et al. | |
| 2006/0056513 A1 | 3/2006 | Shen et al. | |
| 2006/0056708 A1 | 3/2006 | Shen et al. | |
| 2009/0027383 A1* | 1/2009 | Bakalash et al. | 345/419 |
| 2009/0278842 A1 | 11/2009 | Peterfreund | |
| 2009/0289945 A1 | 11/2009 | Peterfreund | |
| 2010/0302078 A1* | 12/2010 | Schuessler | 341/90 |
| 2011/0069139 A1 | 3/2011 | Liu | |
| 2011/0216833 A1* | 9/2011 | Chen et al. | 375/240.16 |
| 2012/0229602 A1* | 9/2012 | Chen et al. | 348/43 |
| 2012/0299938 A1 | 11/2012 | Iwasaki | |
| 2013/0017889 A1 | 1/2013 | Kozlov | |
| 2013/0101017 A1 | 4/2013 | De Vleeschauwer et al. | |
| 2013/0263199 A1 | 10/2013 | Iwasaki | |
| 2013/0293675 A1 | 11/2013 | Iwasaki | |

FOREIGN PATENT DOCUMENTS

| | | |
|---|---|---|
| EP | 2384001 | 11/2011 |
| JP | 07-327231 | 12/1995 |
| JP | 8-305895 | 11/1996 |
| JP | 3287977 | 3/2002 |
| JP | 2002-369205 | 12/2002 |
| JP | 2004-517590 | 6/2004 |
| JP | 2006-094494 | 4/2006 |
| JP | 4004408 | 8/2007 |
| JP | 2007-251543 | 9/2007 |
| JP | 2008-048178 | 2/2008 |
| JP | 2008-252651 | 10/2008 |
| JP | 2013-041568 | 2/2013 |
| JP | 2013-042539 | 2/2013 |
| WO | 02/060183 | 8/2002 |
| WO | 2009/138878 | 11/2009 |
| WO | 2013/024640 | 2/2013 |
| WO | 2013/125220 | 8/2013 |

OTHER PUBLICATIONS

U.S. Appl. No. 13/938,612 to Tetsuji Iwasaki, filed Jul. 10, 2013.
U.S. Appl. No. 13/972,375 to Tetsuji Iwasaki, filed Aug. 21, 2013.
U.S. Appl. No. 13/899,750 to Tadashi Tsushima, filed May 22, 2013.
International Search Report (ISR) and Written Opinion (WO) in International Application No. PCT/JP2012/067026, dated Sep. 18, 2012.
Extended European Search Report from European Patent Office (EPO) in European Patent Application No. 13752570.5, dated Aug. 18, 2014.
Ismael Daribo et al., "Motion Vector Sharing and Bitrate Allocation for 3D Video-Plus-Depth Coding", Eurasip Journal on Advances in Signal Processing, vol. 2009, No. 1, pp. 1-13 (Jun. 4, 2008).
Yu-Cheng Fan et al., "Three-Dimensional Depth Map Motion Estimation and Compensation for 3D Video Compression", IEEE Transactions on Magnetics, IEEE Service Center, New York, NY, US, vol. 47, No. 3, pp. 691-695 (Mar. 1, 2011).

* cited by examiner

F I G. 10
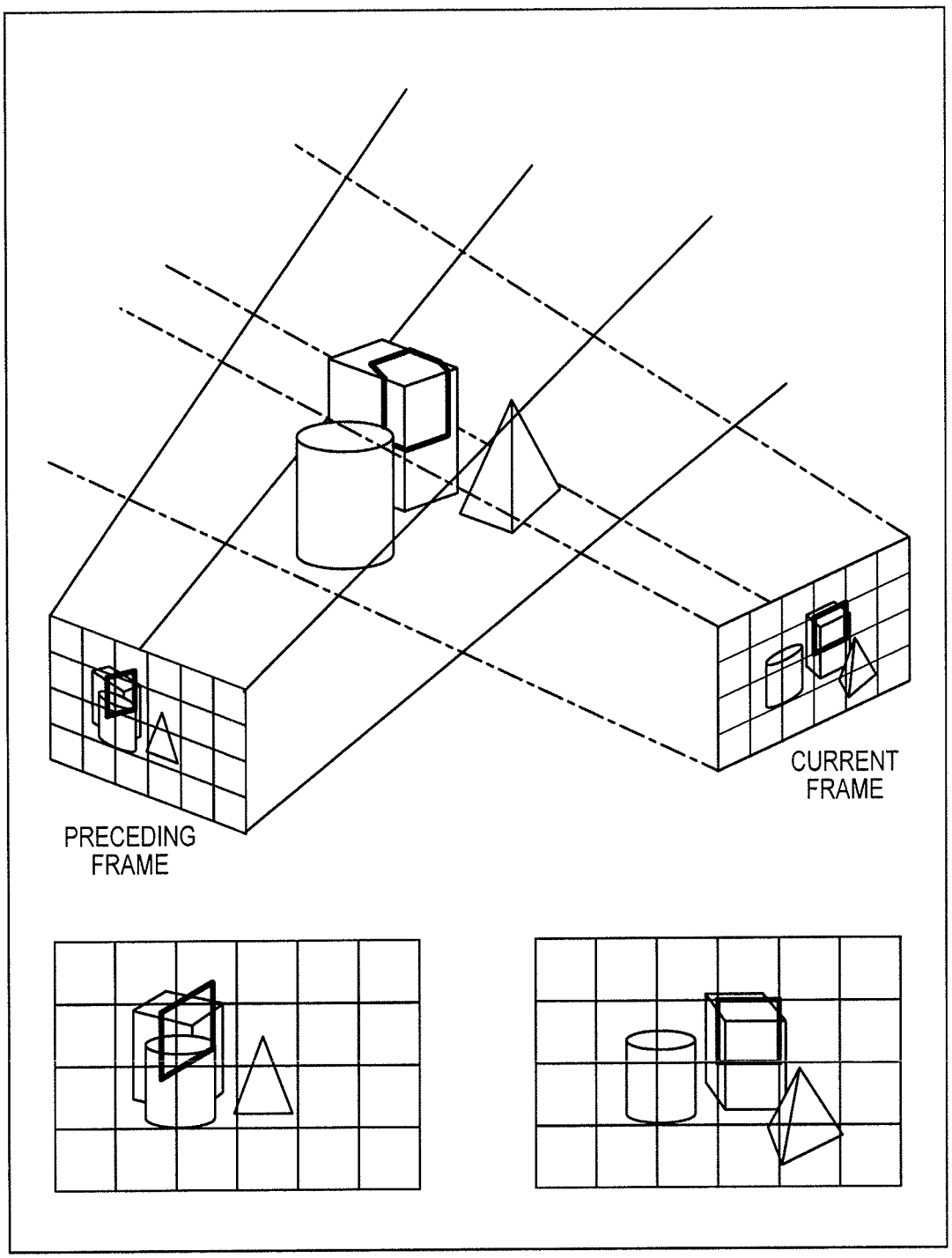

F I G. 12
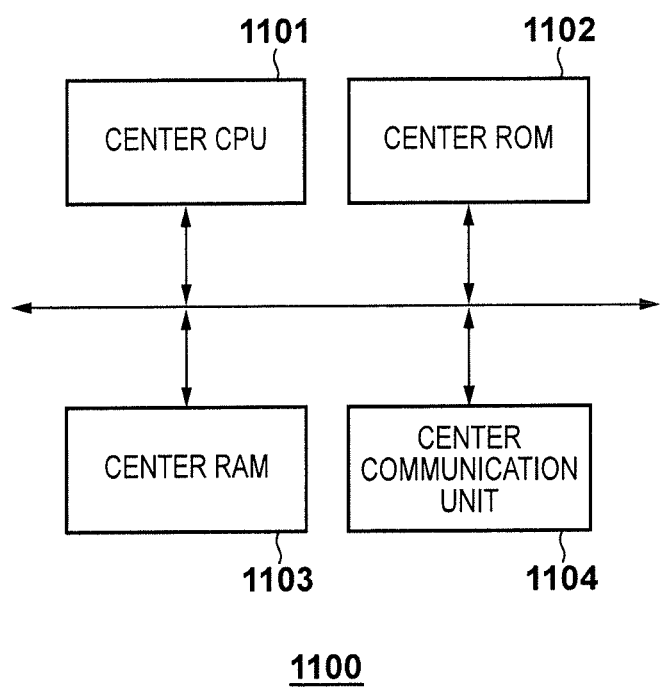

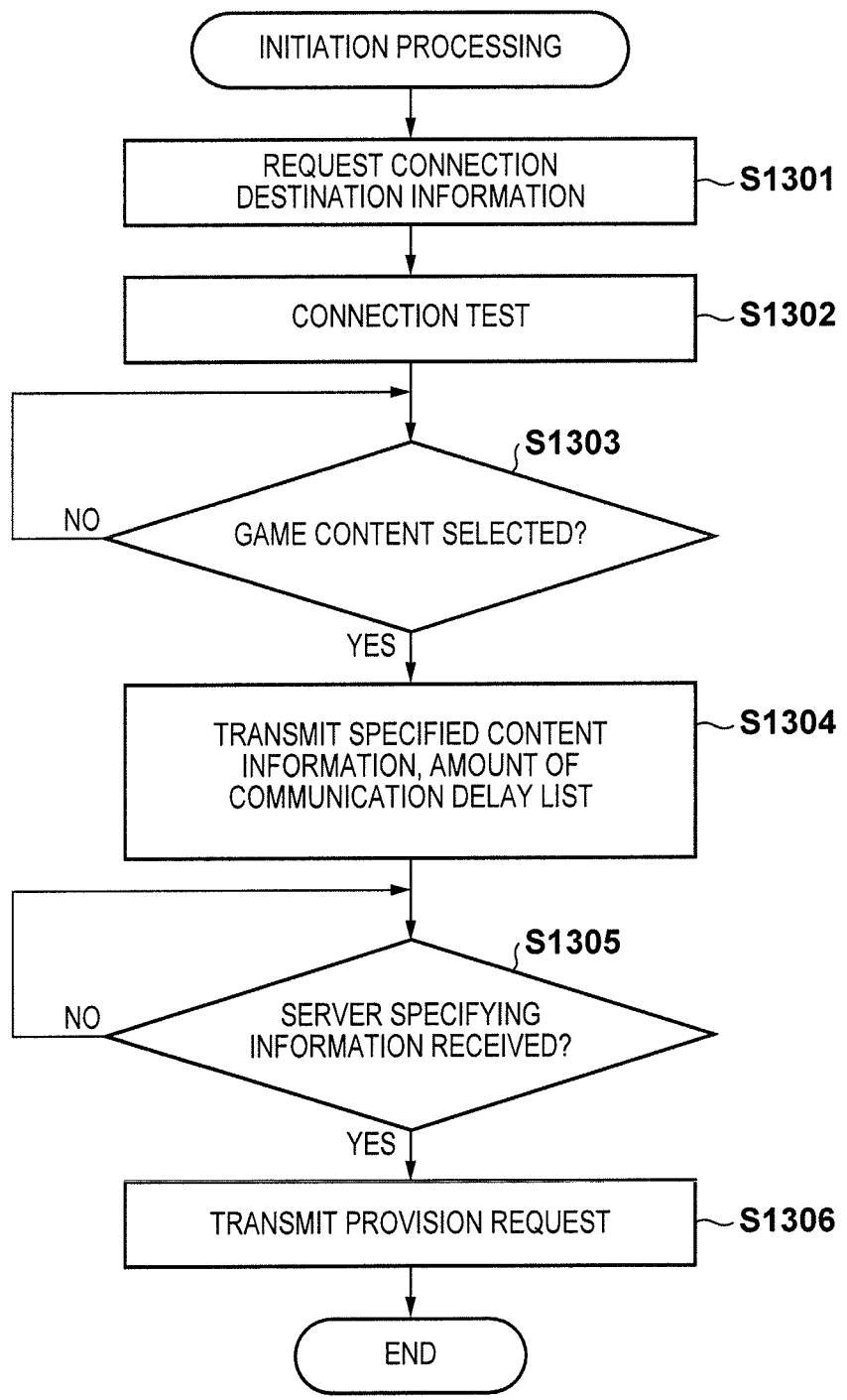

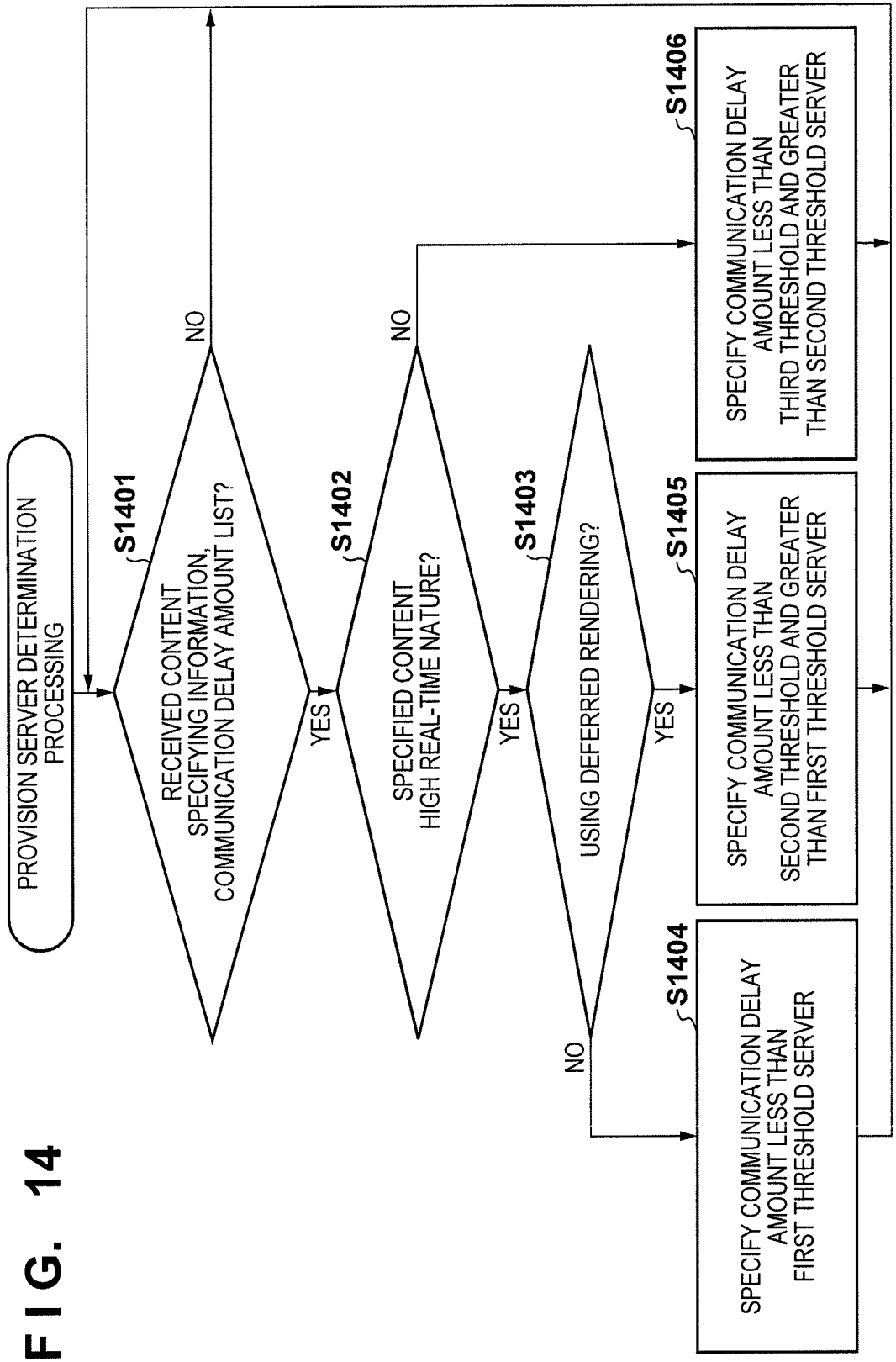

MOVING IMAGE DISTRIBUTION SERVER, MOVING IMAGE REPRODUCTION APPARATUS, CONTROL METHOD, AND RECORDING MEDIUM

This application is a continuation of International Patent Application No. PCT/JP2013/002340 filed on Apr. 4, 2013, and claims priority to Japanese Patent Application No. 2012-091357 filed on Apr. 12, 2012, which is hereby incorporated by reference herein in its entirety.

BACKGROUND OF THE INVENTION

1. Field of the Invention

The present invention relates to a moving image distribution server, a moving image reproduction apparatus, a control method, and a recording medium and, more particularly, to a coded moving image data streaming distribution technique.

2. Description of the Related Art

Client devices such as personal computers (PCs) capable of network connection have become widespread. Along with the widespread use of the devices, the network population of the Internet is increasing. Various services using the Internet have recently been developed for the network users, and there are also provided entertainment services such as games.

One of the services for the network users is a multiuser online network game such as MMORPG (Massively Multiplayer Online Role-Playing Game). In the multiuser online network game, a user connects his/her client device in use to a server that provides the game, thereby doing match-up play or team play with another user who uses another client device connected to the server.

In a general multiuser online network game, each client device sends/receives data necessary for game rendering to/from the server. The client device executes rendering processing using the received data necessary for rendering and presents the generated game screen to a display device connected to the client device, thereby providing the game screen to the user. Information the user has input by operating an input interface is sent to the server and used for calculation processing in the server or transmitted to another client device connected to the server.

However, some network games that cause a client device to execute rendering processing require a user to use a PC having sufficient rendering performance or a dedicated game machine. For this reason, the number of users of a network game (one content) depends on the performance of the client device required by the content. A high-performance device is expensive, as a matter of course, and the number of users who can own the device is limited. That is, it is difficult to increase the number of users of a game that requires high rendering performance, for example, a game that provides beautiful graphics.

In recent years, however, there are also provided games playable by a user without depending on the processing capability such as rendering performance of a client device. In a game as described in PTL1, a server acquires the information of an operation caused in a client device and provides, to the client device, a game screen obtained by executing rendering processing using the information.

CITATION LIST

Patent Literature

PTL1: International Publication No. 2009/138878

SUMMARY OF THE INVENTION

In the above-described game of PTL1, the game screen provided by the server to the client device is provided in the form of coded moving image data to reduce the information amount to be sent. A general moving image coding type such as an MPEG standard performs intra coding (intra-frame coding) without motion compensation for each block obtained by dividing one frame image or inter coding (inter-frame coding) with motion compensation by inter-frame prediction, although this changes depending on the adopted coding type. For each coding type, an object of high compression efficiency exists. In general, blocks (iblock and pblock) are generated by performing intra coding and inter coding for each block, and a block of high compression efficiency is included in coded data.

In intra coding, DCT, run-length coding, and the like are applied to an unprocessed block image of compression target, thereby compressing the image. On the other hand, in inter coding, the difference image between a block image of compression target and a reference image extracted from the preceding frame image in correspondence with the block is generated. Then, DCT, run-length coding, and the like are applied to the image to compress it. For this reason, inter coding includes processing of specifying, in the preceding frame image, a region having the highest correlation to the compression target block image. In the processing associated with detection of the region having the highest correlation, analysis is performed by calculating the similarity and distance to the compression target block image while moving the evaluation region in the preceding frame image. Hence, this analysis processing may take time.

Especially in, for example, a game that changes the rendered contents interactively based on user input, real-time rendering, that is, high-speed response to input is needed, and the time required for moving image coding processing is limited. In this case, it is necessary to quickly perform coding processing of each block and processing of determining whether to perform intra coding or inter coding. However, no detailed method of quickly and efficiently performing moving image coding of a rendered screen has been disclosed yet.

The present invention has been made in consideration of the above-described problems of the prior art, and provides a moving image distribution server for quickly and efficiently performing moving image coding of a screen obtained by rendering processing, a moving image reproduction apparatus, a control method, and a recording medium.

The present invention in its first aspect provides a moving image distribution server comprising: an acquisition unit which is able to sequentially acquire viewpoint information to determine a screen to be rendered; a rendering unit which is able to render a distribution screen by rendering processing in at least two stages using the viewpoint information acquired by the acquisition unit, wherein the rendering unit generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value map; a division unit which is able to acquire the Depth map of the intermediate value maps generated for a first screen and divide the Depth map into a plurality of blocks during execution of the rendering processing of the subsequent stage for the first screen; a specifying unit which is able to specify, for each of the plurality of blocks, a region corresponding to the block on a Depth map generated for a second screen rendered before the first screen; a coding unit which is able to generate, after an end of the rendering processing of the subsequent stage for the first screen, coded moving image data by coding the first screen, wherein for a block, out of the plurality of blocks, whose similarity to the corresponding region specified by the specifying unit is not less than a threshold, the coding unit performs inter-frame coding between an image of the block of the first screen and an image of the corresponding region of the second screen, and for a block, out of the plurality of blocks, whose similarity to the corresponding region specified by the specifying unit is less than the threshold, the coding unit performs intra-frame coding of the image of the block of the first screen; and a sending unit which is able to send data to an external device, wherein the sending unit: sends, for the block whose similarity to the corresponding region is not less than the threshold, the block and specific information to specify the corresponding region for the block to the external device before the coding unit completes generation of the coded moving image data of each block of the first screen; and sends the coded moving image data to the external device after the coding unit has completed generation of the coded moving image data of each block of the first screen.

The present invention in its second aspect provides a moving image reproduction apparatus for sequentially acquiring from a moving image distribution server, decoding and reproducing coded moving image data into which a screen of one frame was coded, comprising: a first reception unit which is able to receive, for first coded moving image data into which a first screen is encoded, a block for which inter-frame coding has been performed and specific information for specifying reference data to be used for decoding the block; a decoding preprocessing unit which is able to generate, from a second screen acquired by decoding second coded moving image data acquired before the first coded moving image data, the reference data to be used for decoding the first coded moving image data for each block for which the inter-frame coding has been performed based on the specific information received by the first reception unit; a second reception unit which is able to receive the first coded moving image data from the moving image distribution server after reception of the specific information; and a decoding unit which is able to decode and reproduce the first coded moving image data received by the second reception unit using the reference data generated by the decoding preprocessing unit for each block for which the inter-frame coding was performed.

The present invention in its third aspect provides a control method of a moving image distribution server, comprising: an acquisition step of causing an acquisition unit of the moving image distribution server to sequentially acquire viewpoint information to determine a screen to be rendered; a rendering step of causing a rendering unit of the moving image distribution server to render a distribution screen by rendering processing in at least two stages using the viewpoint information acquired in the acquisition step, wherein the rendering unit generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value map; a division step of causing a division unit of the moving image distribution server to acquire and divide into a plurality of blocks, during execution of the rendering processing of the subsequent stage for a first screen, a Depth map out of the intermediate value map generated for the first screen; a specifying step of causing a specifying unit of the moving image distribution server to specify, for each of the plurality of blocks, a corresponding region which corresponds to the block on a Depth map generated for a second screen rendered before the first screen; a coding step of causing a coding unit of the moving image distribution server to generate, after an end of the rendering processing of the subsequent stage for the first screen, coded moving image data by coding the first screen, wherein for a block, out of the plurality of blocks, whose similarity to the corresponding region specified in the specifying step is not less than a threshold, the coding unit performs inter-frame coding between an image of the block of the first screen and an image of the corresponding region of the second screen, and for a block, out of the plurality of blocks, whose similarity to the corresponding region specified in the specifying step is less than the threshold, the coding unit performs intra-frame coding of the image of the block of the first screen; and a sending step of causing a sending unit of the moving image distribution server to send data to an external device, wherein in the sending step, the sending unit sends, for the block, out of the plurality of blocks, whose similarity to the corresponding region is not less than the threshold, the block and specific information to specify the corresponding region for the block to the external device before generation of the coded moving image data of each block of the first screen is completed in the coding step, and sends the coded moving image data to the external device after generation of the coded moving image data of each block of the first screen is completed in the coding step.

The present invention in its fourth aspect provides a control method of a moving image reproduction apparatus for sequentially acquiring from a moving image distribution server, decoding and reproducing coded moving image data into which a screen of one frame is coded, comprising: a first reception step of causing a first reception unit of the moving image reproduction apparatus to receive a block for which inter-frame coding was performed and specific information for specifying reference data to be used for decoding the block for first coded moving image data obtained by coding a first screen; a decoding preprocessing step of causing a decoding preprocessing unit of the moving image reproduction apparatus to generate, from a second screen obtained by decoding second coded moving image data acquired before the first coded moving image data, the reference data to be used for decoding the first coded moving image data for each block that has performed the inter-frame coding based on the specific information received in the first reception step; a second reception step of causing a second reception unit of the moving image reproduction apparatus to receive the first coded moving image data from the moving image distribution server; and a decoding step of causing a decoding unit of the moving image reproduction apparatus to decode and reproduce the first coded moving image data received in the second reception step using the reference data generated in the decoding preprocessing step for each block that has performed the inter-frame coding.

The present invention in its fifth aspect provides a moving image distribution system having a moving image distribution server that transmits coded moving image data into which a distribution screen of one frame that was rendered was coded and a moving image reproduction apparatus that sequentially acquires, decodes and reproduces the coded moving image data, wherein the moving image distribution server comprises: an acquisition unit which is able to sequentially acquire viewpoint information to determine a screen to be rendered; a rendering unit which is able to render the distribution screen by rendering processing in at least two stages using the viewpoint information acquired by the acquisition unit, wherein the rendering unit generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value map; a division unit which is able to acquire out of the intermediate value map, and divide into a plurality of blocks, a Depth map, which was generated for a first screen, during execution of the rendering processing of the subsequent stage for the first screen; a specifying unit which is able to specify, for each of the plurality of blocks, a corresponding region which corresponds to the block in a Depth map of a second screen rendered before the first screen; a coding unit which is able to generate, after an end of the rendering processing of the subsequent stage for the first screen, first coded moving image data by performing, for a block, out of the plurality of blocks, whose similarity to the corresponding region specified by the specifying unit is not less than a threshold, inter-frame coding between an image of the block of the first screen and an image of the corresponding region of the second screen and performing, for a block, out of the plurality of blocks, whose similarity to the corresponding region specified by the specifying unit is less than the threshold, intra-frame coding of the image of the block of the first screen for a sending unit which is able to send data to the moving image reproduction apparatus, and wherein the moving image reproduction apparatus comprises a first reception unit which is able to receive a block for which inter-frame coding has been performed and specific information for specifying reference data to be used for decoding the block for first coded moving image data; a decoding preprocessing unit which is able to generate, from the second screen obtained by decoding second coded moving image data acquired from the moving image distribution server before the first coded moving image data, the reference data to be used for decoding the first coded moving image data for each block for which the inter-frame coding was performed based on the specific information received by the first reception unit; a second reception unit which is able to receive the first coded moving image data from the moving image distribution server after reception of the specific information; and a decoding unit which is able to decode and reproduce the first coded moving image data received by the second reception unit using the reference data generated by the decoding preprocessing unit for each block for which the inter-frame coding was performed, and wherein sending unit sends, for the block, out of the plurality of blocks, whose similarity to the corresponding region specified by the specifying unit is not less than a threshold, the block and specific information to specify the corresponding region for the block to the moving image reproduction apparatus before coding by the coding unit of each block of the first screen completes, and sends the coded moving image data to the moving image distribution server after coding by the coding unit of each block of the first screen completes.

By the present invention having this kind of configuration, it is possible to quickly and efficiently perform moving image coding of screens acquired by rendering processing.

Other characteristics and advantages of the present invention will become clear from the following explanation with reference to the attached drawings. Note, in the attached drawings common reference numerals are given to similar configurations.

BRIEF DESCRIPTION OF THE DRAWINGS

The attached drawings are included in the specification, compose a part of them, show arrangement and embodiments of the present invention, and are used for explaining principles of the present invention with their description.

FIG. 10 is a view for explaining a method of estimating a region supposed to have the highest correlation according to a modification of the present invention.

FIG. 12 is a block diagram showing the functional arrangement of a central server 1000 according to the second embodiment of the present invention.

FIG. 13 is a flowchart illustrating initiation processing of the PC 100 according to the second embodiment of the present invention.

FIG. 14 is a flowchart illustrating provision server determination processing of the central server 1100 according to the second embodiment of the present invention.

DESCRIPTION OF THE EMBODIMENTS

First Embodiment

An exemplary embodiment of the present invention will now be described in detail with reference to the accompanying drawings. Note that in the following embodiment, an example of a moving image distribution system will be explained in which the present invention is applied to a PC 100 serving as a moving image reproduction apparatus and a moving image distribution server 200.

<Arrangement of Moving Image Distribution System>

Figure 1:
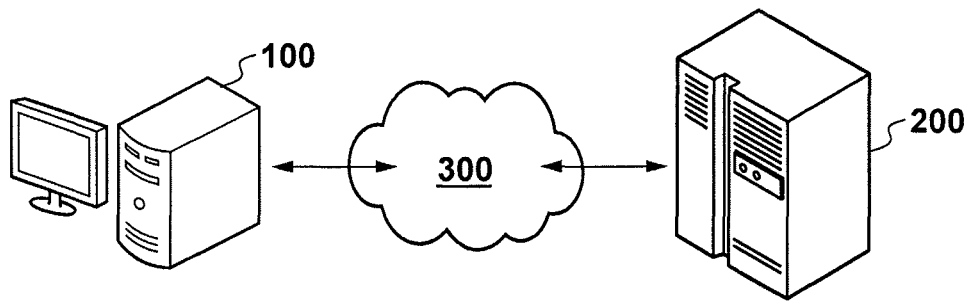
FIG. 1 is a view showing the system arrangement of a moving image distribution system according to the first embodiment of the present invention.

FIG. 1 is a view showing the system arrangement of a moving image distribution system according to the embodiment of the present invention.

As shown in FIG. 1, the PC 100 and the moving image distribution server 200 are connected via a network 300 such as the Internet. In this embodiment, the PC 100 receives, as coded moving image data, a game screen of a game content executed in the moving image distribution server 200 as an example of a moving image distribution content. In this embodiment, the moving image distribution server 200 receives an operation (user input) caused in the PC 100 and renders a game screen corresponding to the operation on the frame basis. The moving image distribution server 200 then codes the rendered game screen and distributes the obtained coded moving image data to the PC 100. Upon receiving the coded moving image data from the moving image distribution server 200, the PC 100 decodes and reproduces the coded moving image data, thereby providing the game screen to the user.

In this embodiment, a content that provides a game screen rendered by a game program executed in the moving image distribution server 200 on the network 300 will be described as an example of a moving image distribution content. However, the practice of the present invention is not limited to this. The moving image distribution server 200 need only be configured to perform rendering processing to render each frame of a moving image distribution content to be provided to the distribution destination and distribute coded moving image data obtained by coding processing performed for each frame. Rendering of a screen of one frame need not always be executed in the moving image distribution server 200 and may be executed by, for example, an external rendering server.

In this embodiment, the PC 100 will be described as a client device connected to the moving image distribution server 200. However, the practice of the present invention is not limited to this. The client device connected to the moving image distribution server 200 can be any other device capable of decoding and reproducing coded moving image data received from the moving image distribution server 200, for example, a consumer game machine, a portable game machine, a cellular phone, a PDA, or a tablet.

<Arrangement of PC 100>

Figure 2:
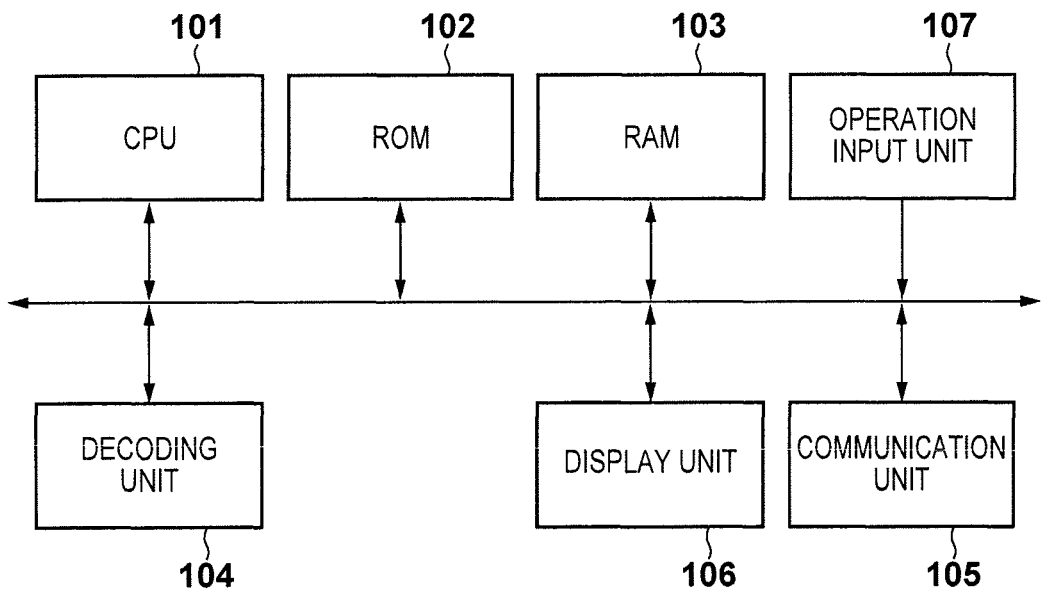
FIG. 2 is a block diagram showing the functional arrangement of a PC 100 according to the embodiment of the present invention.

FIG. 2 is a block diagram showing the functional arrangement of the PC 100 according to the embodiment of the present invention.

A CPU 101 controls the operation of each block of the PC 100. More specifically, the CPU 101 controls the operation of each block by reading out an operation program of moving image reproduction processing recorded in, for example, a ROM 102 or a recording medium, and extracting and executing the program on a RAM 103.

The ROM 102 is, for example, a rewritable nonvolatile memory. The ROM 102 stores the information of constants and the like necessary for the operation of each block of the PC 100 in addition to operation programs of moving image reproduction processing and the like.

The RAM 103 is a volatile memory. The RAM 103 serves as not only an operation program extraction area but also a storage area for temporarily storing intermediate data and the like output in the operation of each block of the PC 100.

A decoding unit 104 performs decoding processing of coded moving image data received by a communication unit 105 to be described later so as to generate a game screen of one frame. Before the decoding processing of coded moving image data, the decoding unit 104 performs decoding preprocessing of preparing reference data to be used in the decoding processing. The decoding preprocessing and decoding processing executed by the decoding unit 104 will be explained in detail concerning moving image reproduction processing to be described later.

The communication unit 105 is a communication interface provided in the PC 100. The communication unit 105 sends/receives data to/from another device such as the moving image distribution server 200 connected via the network 300. At the time of data sending, the communication unit 105 converts data into a data transmission format predetermined for the network 300 or the device of the sending destination and sends the data to the device of the sending destination. At the time of data reception, the communication unit 105 converts the data received via the network 300 into an arbitrary data format readable by the PC 100 and stores the data in, for example, the RAM 103.

In this embodiment, the description will be made assuming that the PC 100 and the moving image distribution server 200 are connected via the network 300. However, the PC 100 and the moving image distribution server 200 may, for example, directly be connected using a cable, as can easily be understood.

A display unit 106 is a display device such as an LCD monitor connected to the PC 100. The display unit 106 performs display control to display a received game screen in a display region. Note that the display unit 106 can be either a display device incorporated in the PC 100 such as a laptop PC or a display device externally connected to the PC 100 using a cable.

An operation input unit 107 is a user interface such as a mouse, a keyboard, or a game pad provided on the PC 100. Upon detecting that an operation of the user interface has been caused, the operation input unit 107 outputs a control signal corresponding to the operation to the CPU 101.

<Arrangement of Moving Image Distribution Server 200>

Figure 3:
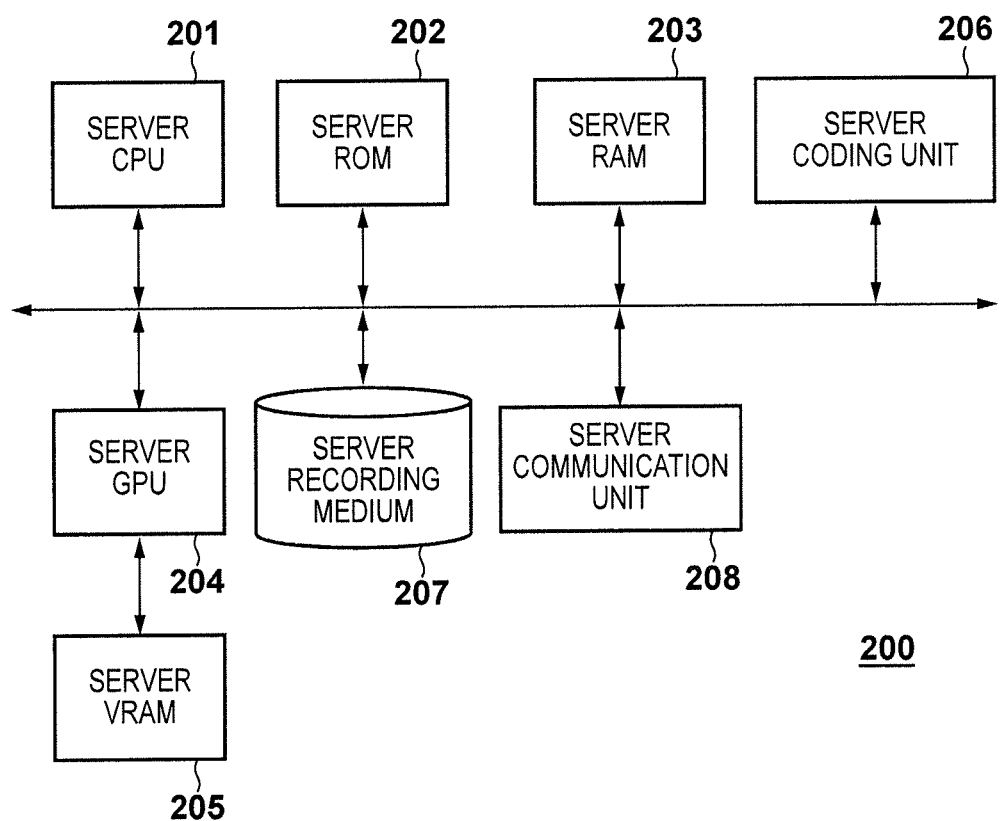
FIG. 3 is a block diagram showing the functional arrangement of a moving image distribution server 200 according to the embodiment of the present invention.

FIG. 3 is a block diagram showing the functional arrangement of the moving image distribution server 200 according to the embodiment of the present invention.

A server CPU 201 controls the operation of each block of the moving image distribution server 200. More specifically, the server CPU 201 controls the operation of each block by reading out an operation program of moving image distribution processing recorded in, for example, a server ROM 202, and extracting and executing the program on a server RAM 203.

The server ROM 202 is, for example, a rewritable nonvolatile memory. The server ROM 202 stores the information of constants and the like necessary for the operation of each block of the moving image distribution server 200 in addition to operation programs of moving image distribution processing and the like.

The server RAM 203 is a volatile memory. The server RAM 203 serves as not only an operation program extraction area but also a storage area for temporarily storing intermediate data and the like output in the operation of each block of the moving image distribution server 200.

A server GPU 204 generates a game screen to be displayed on the display unit 106 of the PC 100. A server VRAM 205 is connected to the server GPU 204. Upon receiving a rendering instruction and the information (viewpoint information) of the position and direction of a camera to be used for rendering of a game screen from the server CPU 201, the server GPU 204 reads out a rendering object concerning the rendering instruction from, for example, a server recording medium 207 to be described later and stores it in a GPU memory. When rendering on the connected server VRAM 205, the server GPU 204 extracts the rendering object to the cache memory and then writes the extracted rendering object in the server VRAM 205.

Note that in rendering processing of generating a game screen, the server GPU 204 of this embodiment uses a so-called Deferred Rendering method.

In a conventional rendering method, each rendering object included in a game screen is sequentially selected and rendered by performing the following processings:

1. movement/rotation processing by a vertex shader;
2. vertex processing by a geometry shader; and
3. effect processing including pixel-basis shadow processing by a pixel shader.

That is, the conventional rendering method is so-called Forward Rendering method performing a procedure "shadow processing→rendering" for each rendering object. In Forward Rendering, objects are sequentially processed. Hence, the rendered contents of one object may be overwritten by those of another object located closer to the camera (located nearer than the object of interest) depending on the pixels. In this case, the shadow processing is wastefully applied for a partial region of the object rendered first, which is occluded by the object rendered later. In addition, for example, a light source existing in a rendered scene is common to all objects existing in the scene. In Forward Rendering, however, it is difficult to reuse common calculation contents for rendering one object to render another object. For these reasons, the Forward Rendering is not efficient in game screen rendering with particularly complex shadow processing.

On the other hand, in Deferred Rendering, geometry to be used for shadow processing is calculated first, and shadow processing of all rendering objects is performed later at once, unlike the Forward Rendering. That is, the rendering processing is executed in two stages including a procedure "geometry rendering→shadow processing→rendering". In the Deferred Rendering, the geometry is rendered together with parameters to be used for shadow processing without lighting in rendering of the preceding stage, thereby generating a plurality of intermediate value maps (Albedo map, Depth map, Normal map, Specular map, Diffuse map, and the like) representing the intermediate values to be used for the shadow processing. In rendering of the subsequent stage, a screen is rendered by performing shadow processing using a light source while applying the plurality of generated intermediate value maps.

A server coding unit 206 performs coding processing of the game screen generated on the server VRAM 205 by the server GPU 204. The server coding unit 206 divides the game screen of the coding target into blocks and performs intra coding (intra-frame coding) or inter coding (inter-frame coding) of each block. Details of the coding processing will be described later. In this embodiment, the server coding unit 206 performs DCT (Discrete Cosine Transform) of each block for each color channel of YCbCr and then compresses each block by run-length coding. In this embodiment, the description will be made assuming that the server coding unit 206 exists as a single block for performing the coding processing of the game screen. However, the coding processing may be executed by the server GPU 204.

The server recording medium 207 is a recording device such as an HDD detachably connected to the moving image distribution server 200. In this embodiment, the server recording medium 207 is assumed to record the data of each rendering object, the information of a light source arranged in a three-dimensional scene expressed on the screen, and the like, which are used in screen rendering processing.

A server communication unit 208 is a communication interface provided in the moving image distribution server 200. In this embodiment, the server communication unit 208 sends/receives data to/from another device such as the PC 100 connected via the network 300. Note that the server communication unit 208 performs data format conversion based on the communication specification, like the communication unit 105.

<Moving Image Distribution Processing>

Figure 4:
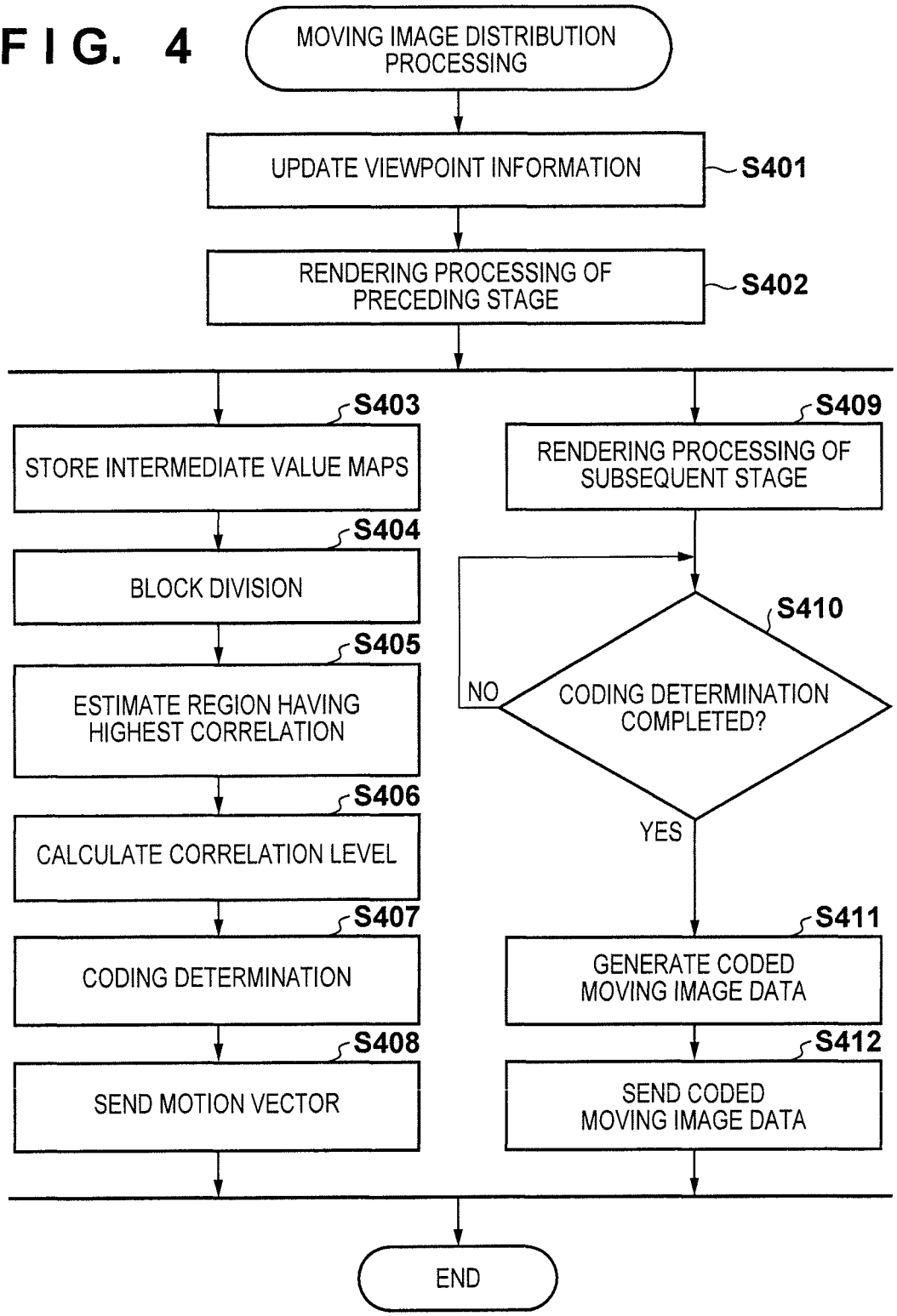
FIG. 4 is a flowchart illustrating moving image distribution processing of the moving image distribution server 200 according to the first embodiment of the present invention.

Detailed moving image distribution processing to be executed by the moving image distribution server 200 of the moving image distribution system according to the embodiment having the above-described arrangement will be described with reference to the flowchart of FIG. 4. Processing corresponding to the flowchart can be implemented by causing the server CPU 201 to read out a corresponding processing program recorded in, for example, the server ROM 202 and extract and execute it on the server RAM 203. Note that the description will be made assuming that the moving image distribution processing is started when the server CPU 201 detects that a distribution request for a game content provided by the moving image distribution server 200 has been received from the PC 100, and repetitively executed for each frame of the game.

Note that in this embodiment, the description will be made assuming that the moving image distribution server 200 provides, to the PC 100, a game screen generated by rendering a three-dimensional scene using the Deferred Rendering method in a form of coded moving image data. However, the content to be distributed by the moving image distribution server 200 is not limited to this, as described above, and can be any arbitrary content for providing a screen obtained by rendering a three-dimensional scene in at least two stages.

In step S401, the server CPU 201 updates the viewpoint information of a game screen to be rendered next. More specifically, the server CPU 201 updates the viewpoint information of a game screen to be rendered next by, for example, referring to the information of an operation input concerning the game caused by the user on the PC 100, which is received by the server communication unit 208. The user operation that may cause update of the viewpoint information corresponds to, for example, a viewpoint position/direction change operation or movement of a character that is the operation target of the user. Note that the viewpoint information to be used for rendering the game screen may be changed not only by a user operation caused on the PC 100 but also in accordance with, for example, the progress of the game.

Figure 5:
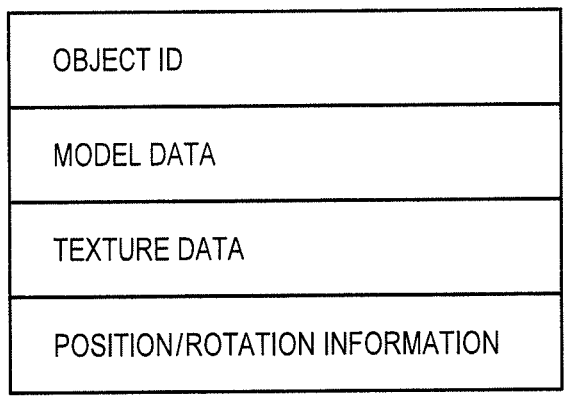
FIG. 5 is a view illustrating the data structure of a rendering object according to the embodiment of the present invention.

In step S402, the server CPU 201 causes the server GPU 204 to execute rendering processing of the preceding stage for the game screen corresponding to the viewpoint information updated in step S401, thereby generating various kinds of intermediate value maps to be used in rendering processing of the subsequent stage. More specifically, the server CPU 201 specifies rendering objects included in the game screen to be rendered and transmits the data of each rendering object to the server GPU 204 in accordance with the rendering order. The server GPU 204 stores the transferred data of the rendering objects in the GPU memory. The data of each rendering object has a structure as shown in, for example, FIG. 5. In this embodiment, each data contains model data (or vertex data and connection data), texture data, and position/rotation information in association with an object ID. Note that the texture data contains not only a general image texture (decal texture) applied (pasted) to a three-dimensional model to express its pattern and the like but also various kinds of maps to be used for shadow processing or material expression of the three-dimensional model.

The server GPU 204 moves and rotates the model data stored in the GPU memory based on the parameters of the position/rotation information of a rendering object to be rendered by a rendering instruction. After that, the server GPU 204 renders the object on the server VRAM 205 without applying light source effects (shadow processing and shading). At this time, a plurality of types of intermediate value maps corresponding to the game screen to be finally provided to the PC 100 are generated on the server VRAM 205. The plurality of types of intermediate value maps are referred to in shadow processing included in rendering processing of the subsequent stage to be described later, and in this embodiment, include at least Albedo map
Depth map
Normal map
Specular map
Diffuse map Note that the intermediate value maps except the Depth map are generated by converting, based on the viewpoint information of the game screen to be rendered, the information of each polygon of corresponding to texture data or model data contained in the data of all rendering objects included in the game screen to be rendered. That is, in Forward Rendering, shadow processing is executed for each rendering object in consideration its texture data, in contrast, in rendering processing of the preceding stage of Deferred Rendering, intermediate value maps are generated by regarding the entire game screen to be rendered as one rendering object. Whereby, this allows to perform shadow processing for the entire game screen in rendering processing of the subsequent stage so as to reduce repetitive calculations.

Note that the Depth map is generated by the conventional method in consideration of occlusion of each pixel by the preceding or subsequent rendering object when rendering each rendering object upon intermediate value map generation.

When rendering processing of the preceding stage is thus completed, the server CPU 201 executes processing of steps S403 to S408 and processing of steps S409 to S412 in parallel.

In step S403, the server CPU 201 stores the intermediate value maps in the server RAM 203 in association with a frame ID for identifying the rendering frame (current frame) and the viewpoint information (a rendering viewpoint information) updated in step S401. For each frame of coded moving image data to be provided to the PC 100, the moving image distribution server 200 of this embodiment stores the Depth map used for generating the rendered game screen in the server RAM 203 and holds them until at least coding processing of the next frame is completed.

In step S404, the server CPU 201 selects the Depth map of the plurality of types of intermediate value maps for coding determination, and divides the intermediate value map for coding determination (determination intermediate value map) into blocks each having a predetermined number of pixels (for example, 16 pixels×16 pixels). As described above, each intermediate value map corresponds to the game screen to be finally provided to the PC 100. For this reason, in this embodiment, the Depth map of the plurality of types of intermediate value maps is used to determine whether to perform inter-frame prediction in moving image coding of each block of the game screen to be provided.

In step S405, for each block of the Depth map, the server CPU 201 specifies a region estimated to have the highest correlation in a Depth map generated in rendering processing of the preceding stage for the game screen of the frame (preceding frame) immediately before the current frame.

First, the server CPU 201 specifies the three-dimensional coordinate values of a rendering object (block specific object) that is rendered at the coordinates of the four corners of the target block. More specifically, the server CPU 201 acquires, from the depth buffer, the depth value at the coordinates of each of the four corners of the target blocks. Next, the server CPU 201 specifies the direction of the block specific object (direction toward the center of the block) based on the rendering viewpoint information and the coordinates of the four corners of the target block. The server CPU 201 specifies the three-dimensional coordinates of the block specific object based on the rendering viewpoint information, the specified direction to the block specific object, and the depth values.

The server CPU 201 then converts the three-dimensional coordinates of the block specific object into screen coordinates on the game screen of the proceeding frame using the viewpoint information (past viewpoint information) used for rendering the game screen of the preceding frame. This enables to specify the coordinates of the four corners of the region supposed to have the highest correlation in the game screen of the preceding frame. That is, in this modification, a region where the same rendering object as in the target block is expressed, that is, a region having rendered contents with a high correlation at a high probability can be specified by inverse transformation to a three-dimensional scene, as shown in FIG. 10.

In step S406, the server CPU 201 calculates the correlation level for the region estimated to have the highest correlation in step S305. More specifically, the server CPU 201 reads out, from the server RAM 203, the Depth map (a past Depth map) generated by rendering processing of the preceding stage for the preceding frame. The server CPU 201 extracts the image of the region estimated to have the highest correlation from the past Depth map and multiplies the image by, for example, a transformation matrix generated from the past viewpoint information and rendering viewpoint information, thereby generating a reference image having as many pixels as the target block. The server CPU 201 calculates, for example, the Euclidean distance between the images, thereby acquiring the correlation level between the reference image and the image of the target block.

Note that when performing inter-frame coding in coding processing to be described later, the moving image distribution server 200 of this embodiment codes, using reference data acquired from the frame immediately before the current frame, the difference image between the current frame image and the reference data. For this reason, the description will be made assuming that the coding determination is also performed for the frame immediately before the current frame. However, the past frame referred to in inter-frame coding is not limited to the frame immediately before the current frame, and any frame before the current frame is usable.

In step S407, the server CPU 201 determines whether to perform intra-frame coding or inter-frame coding for each block of the coding determination Depth map (coding determination). More specifically, the server CPU 201 determines whether the similarity (for example, the reciprocal of the Euclidean distance) calculated for the region, of the past Depth map, estimated to have the highest correlation to each block is equal to or higher than a preset threshold. The server CPU 201 determines to perform inter-frame coding for a block whose similarity to the region having the highest correlation is equal to or higher than the threshold or perform intra-frame coding for a block having a similarity lower than the threshold.

In step S408, the server CPU 201 calculates a motion vector from the region, of the past Depth map, estimated to have the highest correlation for, out of the blocks of the coding determination Depth map, each block determined to perform inter-frame coding. In association with specific information for specifying a block determined to perform inter-frame coding, the server CPU 201 transmits the information of the motion vector for the block to the server communication unit 208 and causes it to send the information to the PC 100 as preprocessing information.

Note, the motion vector calculated in this step is not limited to a 2-dimensional motion vector depending on the movement direction from the viewpoint of the previous frame. In other words, in a case where the viewpoint moved in a direction closer to or farther from a specific rendering object, for example, in addition to the 2-dimensional vector, information for a magnification/reduction scaling factor may also be included. Also, in a case where, for example, the viewpoint rotates in a roll direction, in addition to the 2-dimensional vector, a matrix for rotation may also be included. Also, in a case where, for example, the viewpoint rotates in a yaw direction, instead of the 2-dimensional vector, a 3-dimensional vector may be used for the motion vector. Note, information specifying a region of the previous frame used as reference data is not limited to this and information that specifies the region such as information for specifying vertex coordinates of an immediate region may be used in any form.

On the other hand, in processing parallel to the processing of steps S403 to S408, the server CPU 201 causes, in step S409, the server GPU 204 to execute rendering processing of the subsequent stage for the game screen corresponding to the viewpoint information updated in step S401, thereby generating the game screen (distribution game screen) to be finally provided to the PC 100. More specifically, the server CPU 201 specifies the light source to be applied to the three-dimensional scene of the rendered game screen and transmits the information of the attribute, intensity, and like of the light source to the server GPU 204. The server GPU 204 renders rendering objects included in the game screen again while performing shadow processing (applying light source effects) of various kinds of light sources at once using the various kinds of intermediate value maps generated in the rendering processing of the preceding stage, thereby generating the distribution game screen on the frame buffer of the server VRAM 205.

In step S410, the server CPU 201 determines whether the coding determination processing for the current frame in step S407 is completed. Upon determining that the coding determination processing is completed, the server CPU 201 moves the processing to step S411. Upon determining that the coding determination processing is not completed, the server CPU 201 repeats the processing of step S409.

In step S411, the server CPU 201 divides the distribution game screen into blocks as in the block division of step S404 and executes coding processing to generate coded moving image data.

<Coding Processing>

Figure 6:
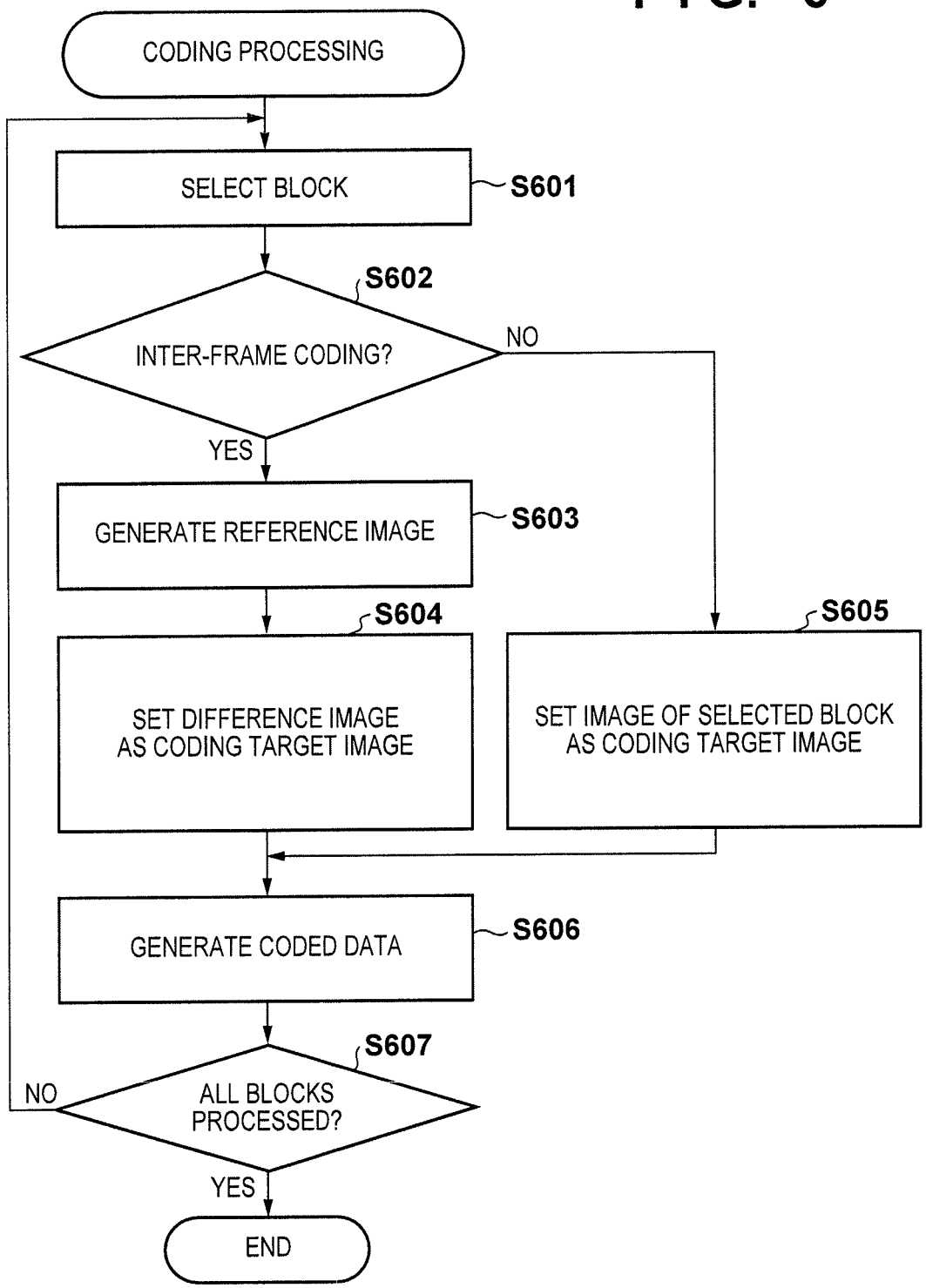
FIG. 6 is a flowchart illustrating coding processing of the moving image distribution server 200 according to the embodiment of the present invention.

Details of coding processing executed in the moving image distribution server 200 of the embodiment will be explained with reference to FIG. 6.

In step S601, the server CPU 201 selects an uncoded block out of the blocks of the distribution game screen.

In step S602, the server CPU 201 determines, by referring to the result of coding determination processing performed for the coding determination Depth map, whether to perform inter-frame coding for the selected block. Upon determining to perform inter-frame coding for the selected block, the server CPU 201 moves the processing to step S603. Upon determining not to perform inter-frame coding, the Server CPU 201 moves the processing to step S605.

In step S603, the server CPU 201 generates a reference image (reference data) to be used for inter-frame coding from the image of the region, corresponding to the selected block, of the game screen (preceding game screen) rendered in the frame immediately before the current frame. More specifically, the server CPU 201 first reads out the game screen (past game screen) provided to the PC 100 in the preceding frame from, for example, the server RAM 203. The server CPU 201 extracts, from the past game screen as the reference image, the image of a region specified for the selected block in correspondence with the region having the highest correlation.

In step S604, the server CPU 201 generates the difference between the image of the selected block and the reference image as a difference image and sets it as a coding target image. More specifically, the server CPU 201 generates the difference image (pblock) by subtracting the pixel value of each pixel of the reference image from the pixel value of a corresponding pixel of the selected block.

On the other hand, if it is determined in step S602 not to perform inter-frame coding, the server CPU 201 sets the image of the selected block as the coding target image in step S605.

In step S606, the server CPU 201 transmits the coding target image to the server coding unit 206 and causes it to execute DCT processing to convert the image into data in the frequency domain. The server CPU 201 also causes the server coding unit 206 to perform run-length coding of the data in the frequency domain obtained by conversion, thereby generating the coded data of the selected block.

In step S607, the server CPU 201 determines whether all blocks of the rendered game screen have performed the processing of step S602 to S606. Upon determining that an unprocessed block exists, the server CPU 201 returns the processing to step S601. Upon determining that no unprocessed block exists, the server CPU 201 terminates the coding processing.

After coded moving image data is generated from the rendered game screen, the server CPU 201 transmits the coded moving image data to the server communication unit 208 and causes it to send the data to the PC 100 in step S412, and terminates the moving image distribution processing of the current frame.

In this way, in the moving image distribution server 200 of the present embodiment, it is possible to estimate by coordinate transformation a region thought to have a highest correlation with a coding block using a Depth map generated by rendering processing in the preceding stage during rendering processing of the subsequent stage in which rendering of a final game screen is performed using the fact that generation of the game screen provided to the PC 100 is performed by rendering processing in multiple stages. For this reason, it is possible to reduce the time required for provision to the PC 100 of the game screen, since it is possible to move onto coding processing without determining a coding method after performing rendering of the final game screen. Also, it is possible to reduce an amount of calculation for correlation calculation for all of the coding blocks during the rendering processing of the subsequent stage without the necessity of specifying a region thought to have a highest correlation having calculated correlation level using a round-robin method.

<Moving Image Reproduction Processing>

Figure 7:
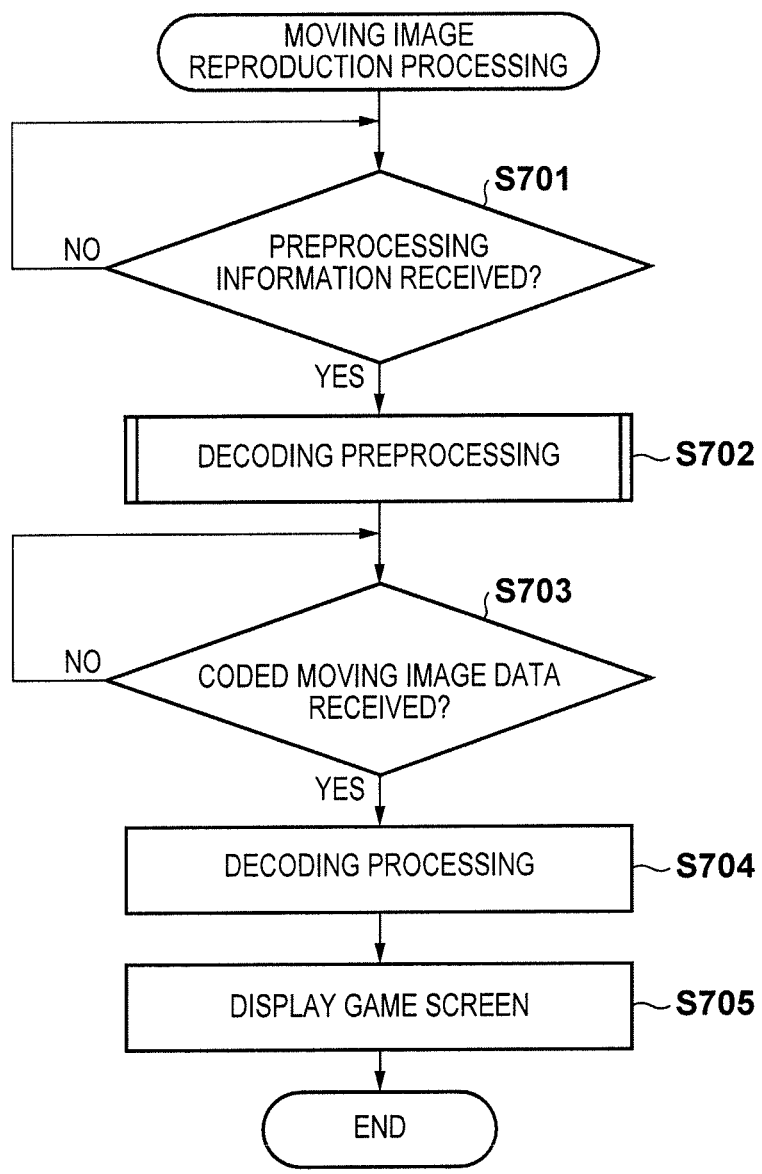
FIG. 7 is a flowchart illustrating moving image reproduction processing of the PC 100 according to the embodiment of the present invention.

Details of moving image reproduction processing to be executed by the PC 100 of the embodiment will be described with reference to the flowchart of FIG. 7. Processing corresponding to the flowchart can be implemented by causing the CPU 101 to read out a corresponding processing program recorded in, for example, the ROM 102 and extract and execute it on the RAM 103. Note that the description will be made assuming that the moving image reproduction processing is started when, for example, an application for receiving a game content provided by the moving image distribution server 200 is executed on the PC 100, and repetitively executed for each frame of the game.

In step S701, the CPU 101 determines whether the communication unit 105 has received preprocessing information from the moving image distribution server 200. Upon determining that preprocessing information has been received from the moving image distribution server 200, the CPU 101 moves the processing to step S702. Upon determining that the information has not been received, the CPU 101 repeats the processing of step S701.

In step S702, the CPU 101 executes decoding preprocessing of preparing reference data necessary for decoding the game screen of the current frame by referring to the preprocessing information.

<Decoding Preprocessing>

Figure 8:
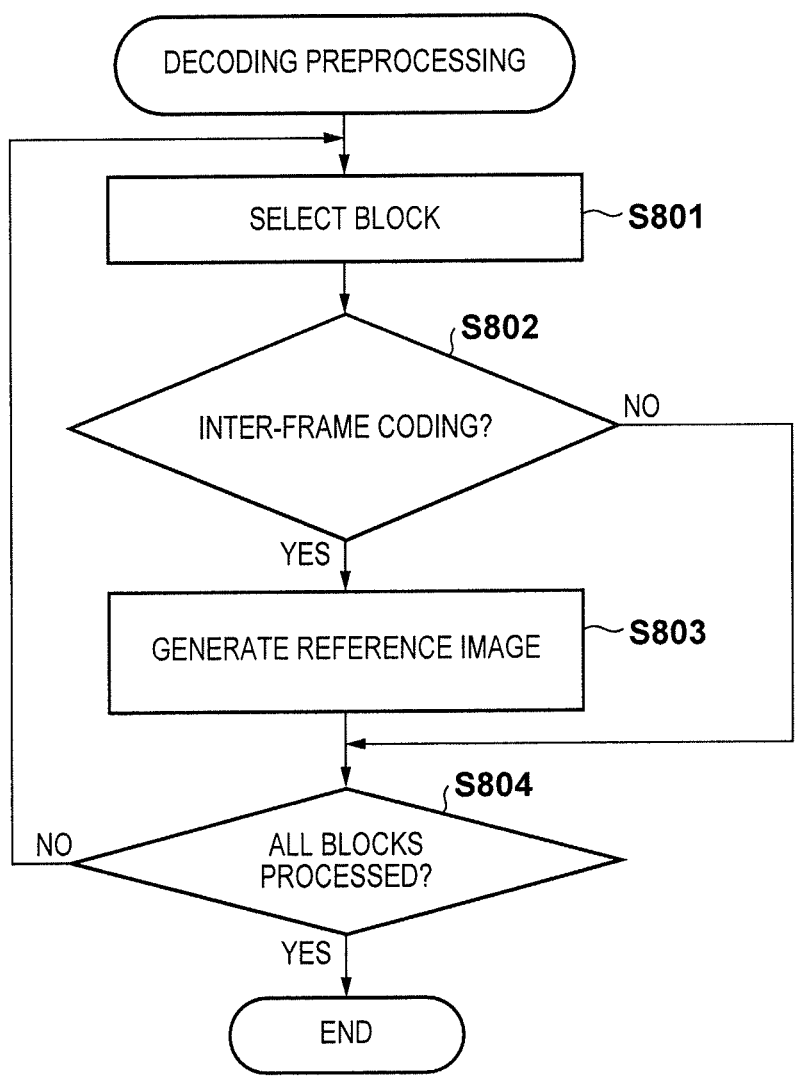
FIG. 8 is a flowchart illustrating decoding preprocessing of the PC 100 according to the embodiment of the present invention.

Details of decoding preprocessing to be executed by the PC 100 of the embodiment will be described with reference to the flowchart of FIG. 8.

In step S801, the CPU 101 selects, out of the blocks of the game screen received in the current frame, a block that has not performed coding type determination used.

In step S802, the CPU 101 determines, by referring to the preprocessing information, whether inter-frame coding has been done for the selected block. More specifically, the CPU 101 determines whether the preprocessing information includes information for specifying the selected block. Upon determining that inter-frame coding has been done for the selected block, the CPU 101 moves the processing to step S803. Upon determining that inter-frame coding has not been done, the CPU 101 moves the processing to step S804.

In step S803, the CPU 101 extracts a reference image (reference data) to be used for decoding the selected block from the game screen (preceding frame screen) decoded in the frame immediately before the current frame. More specifically, the CPU 101 specifies the region to be referred to decode the selected block in the preceding frame screen by referring to the motion vector associated with the selected block and included in the preprocessing information, and extracts the image of the region as the reference image.

In step S804, the CPU 101 determines whether all blocks of the game screen received in the current frame have performed the processing of steps S802 and S803. Upon determining that an unprocessed block exists, the CPU 101 returns the processing to step S801. Upon determining that no unprocessed block exists, the CPU 101 terminates the decoding preprocessing.

As described above, before decoding processing to be executed after reception of coded moving image data, the PC 100 of this embodiment can prepare reference data to be used in decoding processing by referring to the preprocessing information received before coded moving image data.

In step S703, the CPU 101 determines whether the communication unit 105 has received coded moving image data from the moving image distribution server 200. Upon determining that coded moving image data has been received from the moving image distribution server 200, the CPU 101 moves the processing to step S704. Upon determining that no data has been received, the CPU 101 repeats the processing of step S703.

In step S704, the CPU 101 transmits the received coded moving image data to the decoding unit 104 and causes it to execute decoding processing to generate the game screen. More specifically, the decoding unit 104 performs decoding of the run-length-coded data string and inverse DCT processing for each block of the coded moving image data, thereby generating the block data of the game screen of the current frame. For a block that has performed inter-frame coding, the decoding unit 104 adds the reference data generated by the above-described decoding preprocessing, thereby generating the game screen of the current frame.

In step S705, the CPU 101 transmits the game screen of the current frame generated in step S704 to the display unit 106, causes it to display the game screen in a corresponding display region, and terminates the moving image reproduction processing of the current frame.

As described above, the moving image distribution server 200 in the moving image distribution system of this embodiment can transmit coding method information to the PC 100 before coded moving image data is generated and distributed. More specifically, since a reference image can be prepared by preprocessing before reception of the coded moving image data, the time of decoding processing executed after reception of the coded moving image data can be shortened. That is, the moving image distribution method of this embodiment can shorten the time needed until reproduction of a decoded moving image as compared to a conventional method in which a reference image to be used for decoding a block that has performed inter-frame coding is generated from the preceding frame image by referring to a motion vector contained in received coded moving image data.

Figure 9:
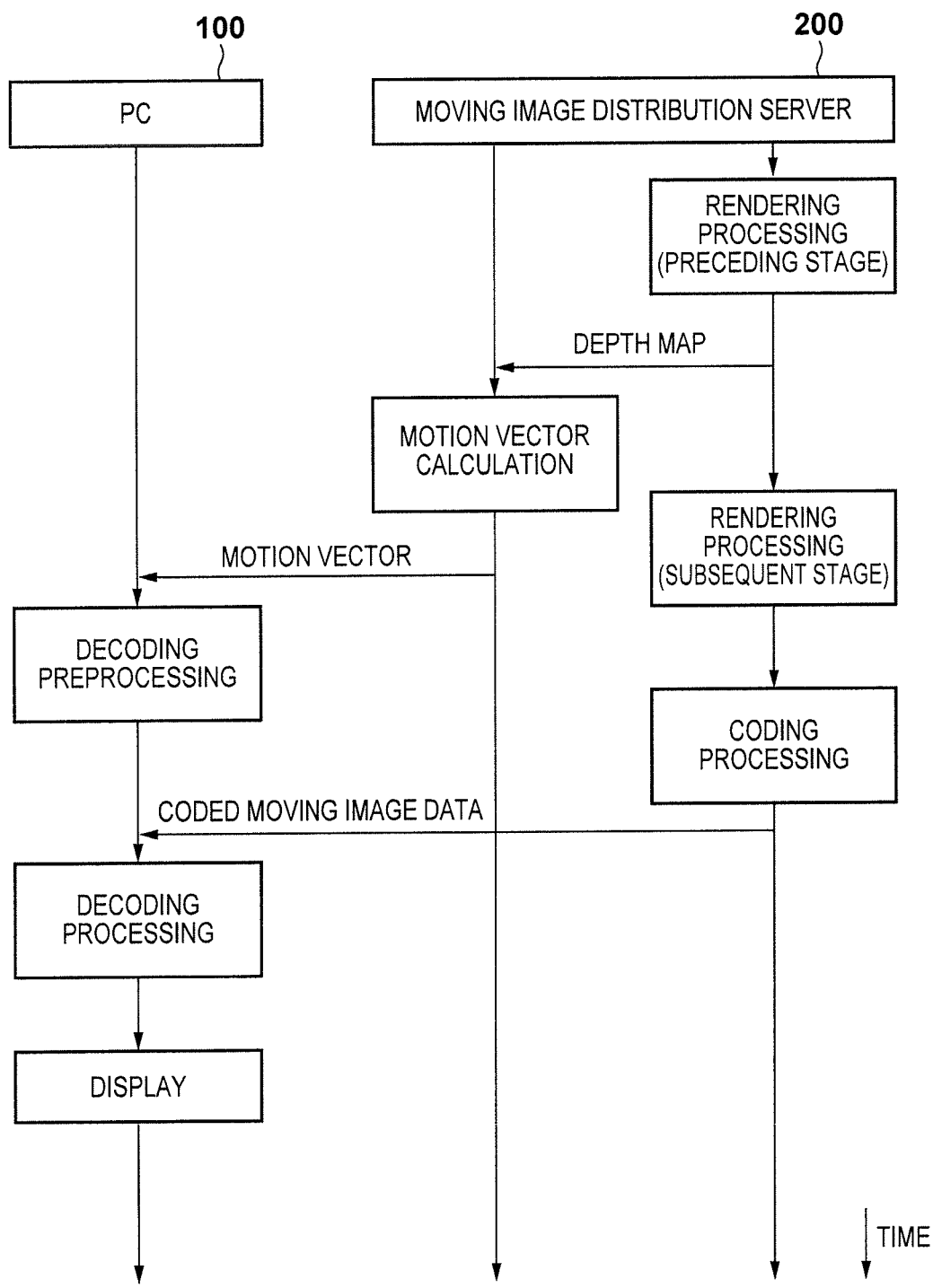
FIG. 9 is a flowchart illustrating overall processing of the moving image distribution system according to the embodiment of the present invention.

That is, the moving image distribution system uses the processing procedure as shown in FIG. 9 as a whole. Applying the present invention allows to implement both efficient moving image coding processing in the moving image distribution server 200 and efficient moving image decoding processing in the PC 100.

Note that the moving image distribution processing has been described above assuming that the preprocessing information is sent to the PC 100 after coding determination has been executed for all blocks of the screen of the current frame. However, the timing of preprocessing information sending is not limited to this, as can easily be anticipated. More specifically, each time a result is obtained by determining whether to perform inter-frame coding for each block, the server CPU 201 may send the preprocessing information of the block to the PC 100 instead of waiting for the determination results of all blocks. In this case, when the CPU 101 of the PC 100 receives preprocessing information and generates the reference image of a block specified by the preprocessing information, the moving image distribution processing can be expected to be more efficient.

As described above, the moving image distribution server of this embodiment can quickly and efficiently perform moving image coding of a screen obtained by rendering processing. More specifically, the moving image distribution server renders a distribution screen by rendering processing in at least two stages using viewpoint information to determine the screen to be rendered. The rendering processing is performed such that the distribution screen is rendered in rendering processing of the subsequent stage by referring to a Depth map generated by rendering processing of the preceding stage. The moving image distribution server selects the Depth map for coding determination during execution of rendering processing of the subsequent stage for the first screen, and determines for each set block whether to perform inter-frame coding by referring to a Depth map generated for a second screen rendered before the first screen. After rendering processing of the subsequent stage has ended for the first screen, the moving image distribution server performs coding in accordance with the determination result and sends the coded moving image data to an external device. The determination result is sent to the external device before generation of the coded moving image data of the first screen is completed.

Second Embodiment

In a case where provision of game content is actually made via communication as described above, a certain cost is necessary for infrastructure deployment required for the provision. This is due to a plurality of the moving image distribution server 200 being installed in view of fault tolerance and responsiveness issue tolerance considering risks such as reduction in provision quality accompanying an increase in a number of connected terminals and breakdown of a moving image distribution server 200 providing content. Also, in general, a server for which a delay to a client device is smallest (in other words one having an ideal response) can be considered to be a server that is geographically closest from the point of view of the transmission route. From these issues, it can be considered that in a case where world-wide content provision is performed, provision servers are deployed in a plurality of countries and also considering the existence of timezones, a plurality of servers are deployed in a single country as a data center. In other words, for infrastructure deployment, realistically provision of data centers will be designed so as that it is possible to share resources of data centers for a plurality of content items rather than being performed per content item.

Meanwhile, there is a tendency for the time bands in which network usage is concentrated to be similar in each country, irrespective of the usage of this kind of service. Specifically, the traffic peak of network usage in Japan is between 19:00 and 23:00. In other words, even if data centers are arranged considering timezones as described above, it can be considered that in a time band in which traffic increases, client devices in that timezone will concentrate on data centers that are geographically closest to them.

In the present embodiment, explanation will be given for a method of suitably performing load balancing between data centers in accordance with whether or not rendering processing in at least two stages of content as in the first embodiment and real-time nature is required for content provision.

<Moving Image Distribution System Arrangement>

Figure 11:
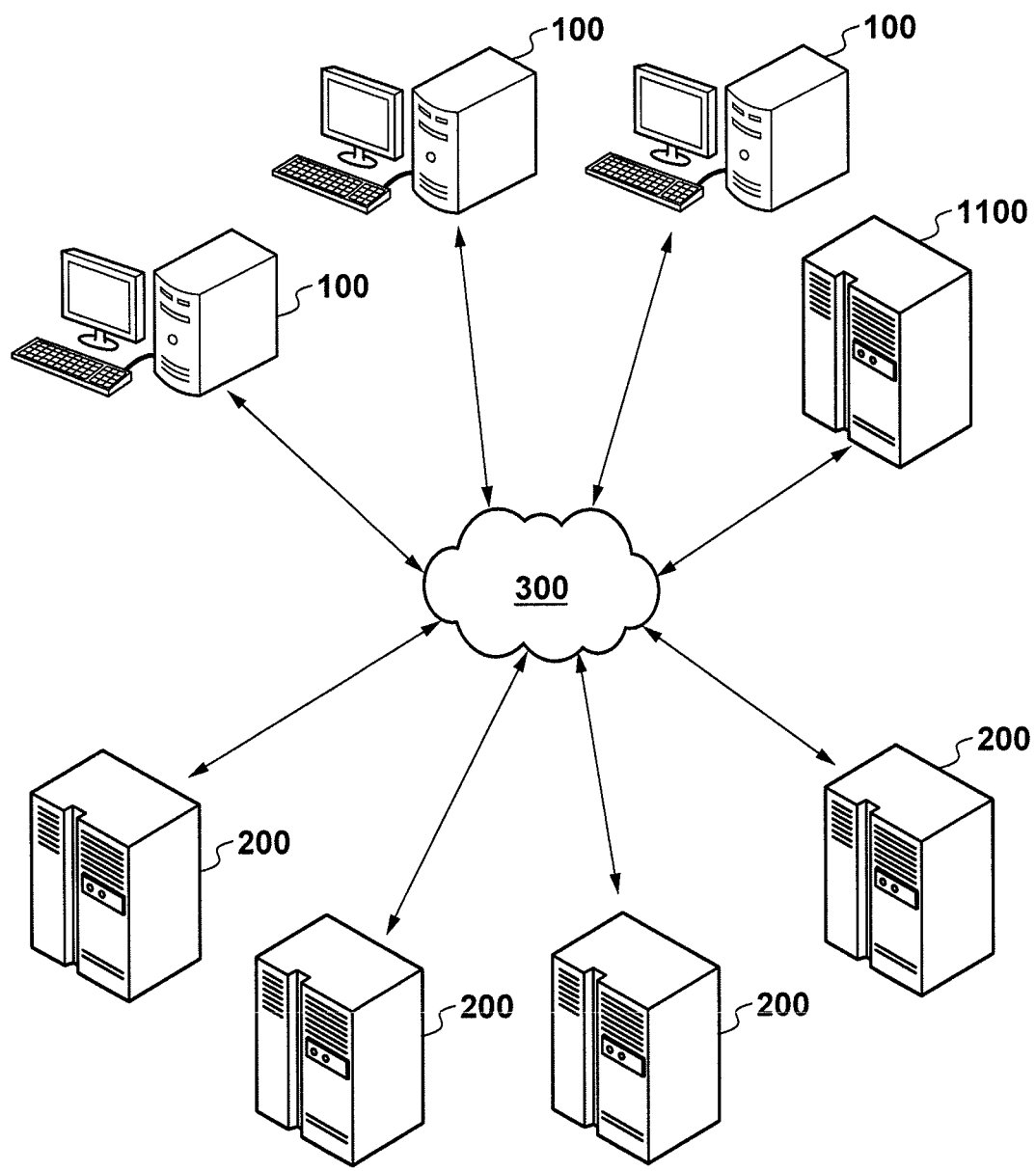
FIG. 11 is a view showing the system arrangement of a moving image distribution system according to the second embodiment of the present invention.

FIG. 11 is a view showing the system arrangement of a moving image distribution system according to the present embodiment. Note, in the moving image distribution system of the present embodiment, arrangement of the PC 100 and of the moving image distribution server 200 respectively has been described above in the first embodiment and so explanation will be omitted.

The moving image distribution system of the present embodiment includes a central server 1100. The central server 1100 is connected to at least the PC 100 via a network 300 so as to be able to communicate. The central server 1100 determines which moving image distribution server 200 that each of the PC 100 should connect to upon content provision and provides information of the corresponding server to the corresponding PC 100. Also, in the present embodiment, explanation is given having the central server 1100 provide to the PC 100 information that specifies a single moving image distribution server 200 as the data center to which connection should be made, but working the present invention is not limited to this. For example, in a case where a data center is arranged to have a plurality of the moving image distribution server 200, an arrangement in which the central server 1100 provides information specifying one moving image distribution server 200 of these may be made, and also an arrangement in which information specifying the data center (a unit that integrally manages the moving image distribution server 200 existing in the same location) is simply provided may be made. In the latter case, for example, it is possible to have a management device that, in response to a content provision request to the data center, allocates within the center an appropriate moving image distribution server 200 for performing the provision and connects the corresponding PC 100.

<Arrangement of the Central Server 1000>

FIG. 12 is a block diagram showing the functional arrangement of a central server 1100 according to the second embodiment of the present invention.

A central CPU 1101 controls operation of each block of the central server 1100. Specifically, the central CPU 1101 controls the operation of each block is by reading out an operation program of each block stored in a central ROM 1102, for example, loading into a central RAM 1103, and executing.

The central ROM 1102 is, for example, a re-writeable non-volatile memory. The central ROM 1102, in addition to operation programs of each block of the central server 1100 stores information of constants and the like necessary in the operation of each block. Also, in the present embodiment, the central ROM 1102, for each of the plurality of game content items for which provision is possible by the moving image distribution server 200 on the network 300, at least information of a responsiveness capability, corresponding to user operation input, required for the content information as to whether or not Deferred Rendering is used in content rendering is stored as management information. The central RAM 1103 is a volatile memory. The central RAM 1103 is used not only as a loading area for operation programs of each block but also as a storage area for temporarily storing intermediate data output in the operation of each block of the central server 1100.

A central communication unit 1104 is a communication interface of the central server 1100. The central communication unit 1104 performs data transmission and receiving with other devices such as the PC 100 connected via the network 300. The central communication unit 1104, as with the communication unit 105 and the server communication unit 208, performs necessary data conversion at the time of data transmission and receiving.

<Initiation Processing>

Below, detailed explanation will be given, referring to the flowchart of FIG. 13, for initiation processing executed on the PC 100 of the present embodiment upon initiation of a game content provision request. Note, this initiation processing will be explained as something that is initiated upon a portal application that is capable of receiving multiple game content item service provision being executed on the PC 100, for example.

In step S1301, the CPU 101 makes a request to the central server 1100 for connection destination information which is information for connecting to the moving image distribution server 200 providing the game content. The connection destination information may be retaining information that the central server 1100 retains in the central ROM 1102, and may be an IP address list of the moving image distribution server 200 performing the service provision, for example.

In step S1302, the CPU 101 executes a connection test on each of the plurality of the moving image distribution server 200 existing on the network 300 referencing the connection destination information received in accordance with the provision request of the connection destination information. In the connection test the CPU 101 measures an amount of communication delay that occurs in communication with the target moving image distribution server 200, associates this with identifier information of the server and stores this in the RAM 103 as information of the amount of communication delay. When the CPU 101 finishes measuring the amount of communication delay for the moving image distribution server 200 included in the connection destination information it moves the processing on to step S1303.

In step S1303, the CPU 101 determines whether or not the game content for which to initiate the provision request is selected. Specifically, the CPU 101 performs the determination in accordance with whether or not a control signal output due to selection of game content that the user wants provision of was received from the operation input unit 107. The CPU 101 moves the processing on to step S1304 in a case where it determines that selection of game content for which to initiate the provision request was made, and repeats the processing of this step in a case where it determines that this was not made.

In step S1304, the CPU 101 transmits to the central server 1100 the amount of communication delay list for each moving image distribution server 200 generated in step S1302 and information specifying the game content for which provision is to be requested.

In step S1305, the CPU 101 determines whether or not server specifying information that specifies a moving image distribution server 200 the will perform the game content provision was received from the central server 1100. The server specifying information is generated by later explained provision server determination processing being executed on the central server 1100. The CPU 101, in a case where it determines that the specifying information was received, moves the processing onto step S1306, and in a case where it determines that it was not received, repeats the processing of this step.

In step S1306, the CPU 101 can cause moving image distribution processing to be initiated on the moving image distribution server 200 by transmitting a provision request for the selected game content to the moving image distribution server 200 specified in the server specifying information.

<Provision Server Determination Processing>

Next, explanation of details for provision server determination processing which determines the moving image distribution server 200 that will provide game content specified on the PC 100 which is executed by the central server 1100 of the present embodiment will be given with reference to the flowchart of FIG. 14. Note, the provision server determination processing will be explained as being initiated upon the loading of the central server 1100.

In step S1401, the central CPU 1101 determines whether or not a list of amount of communication delay of the corresponding PC 100 and each moving image distribution server 200 and information specifying the game content for which provision is received (content specification information) from the PC 100 on the network 300. The central CPU 1101, in a case where it determines that it received the content specification information and the amount of communication delay list, stores this information along with information for identifying the PC 100 (target PC) in the central RAM 1103 and moves the processing on to step S1402. The information for identifying the PC 100 that transmitted the information may be an IP address of the PC, for example. Also, the central CPU 1101, in a case where it determines that it has not received the content specification information and the amount of communication delay list, repeats the processing of this step.

In step S1402, the central CPU 1101 determines whether or not the content identified by the content specification information (specified content) is specified as high real-time nature content for which a high response to user operation input is required. Specifically, the central CPU 1101 determines whether or not the specified content is specified as content requiring high real-time nature, referencing management information stored in the central ROM 1102. The central CPU 1101, in a case where it determines that the specified content is specified as content requiring a high real-time nature, moves the processing on to step S1403, and in a case where it determines that this is not specified, it moves the processing on to step S1406.

In step S1403, the central CPU 1101, referencing management information, determines whether or not the specified content is content for which a distribution screen is rendered using Deferred Rendering. The central CPU 1101, in a case where it determines that the specified content is content for which a distribution screen is rendered using Deferred Rendering, moves the processing on to step S1405, and in a case where it determines that it is content for which a distribution screen is rendered without using it, it moves the processing on to step S1404.

In step S1404, the central CPU 1101, referencing the amount of communication delay list that it received, selects one moving image distribution server 200 for which the amount of communication delay in data communication with the target PC is less than a predetermined threshold (first threshold). Next the central CPU 1101 transmits information specifying the selected moving image distribution server 200 as specification information to the target PC and returns the processing to step S1401.

On the other hand, the central CPU 1101, in a case where it determines that the specified content is content for which a distribution screen is rendered using Deferred Rendering in step S1403, moves the processing on to step S1405, and referring to the received amount of communication delay list, selects one moving image distribution server 200 for which the amount of communication delay is lower than a predetermined threshold (second threshold) and higher than the first threshold. The depends on being able to reduce a processing time required for coding and decoding by using a depth buffer generated in rendering processing of the preceding stage as explained in the first embodiment in a case where Deferred Rendering is used for generation of an effect screen. In other words, even if the content requires real-time nature, because processing reduction is anticipated in a case were the distribution screen is generated performing rendering processing in at least 2 stages, it is possible to permit more amount of communication delay than for content for which 1 stage rendering processing is performed. The central CPU 1101 transmits to the target PC information specifying the moving image distribution server 200 selected in this way as specification information and returns the processing to step S1401.

Also, in a case where in step S1402 it is determined that the specified content is not specified as content requiring high real-time nature, the central CPU 1101, in step S1406, referencing the received amount of communication delay list selects one moving image distribution server 200 having an amount of communication delay that is less than a predetermined threshold (third threshold) and larger than the second threshold. Next, the central CPU 1101 transmits information specifying the selected moving image distribution server 200 as specification information and returns the processing to step S1401.

Note, first threshold and the second threshold are determined so as to satisfy the real-time nature required for the content and the third threshold is determined based on the amount of communication delay that can be permitted. The 3 thresholds may be determined per content item, or they may be determined commonly and not depending on the content. Also, the 3 thresholds may be determined in accordance with a geographical position where the target PC exists.

In this way, in the moving image distribution system of the present embodiment, it is possible to determine, in accordance with a real-time nature required for the content and an amount of communication delay with the server, the moving image distribution server 200 that provides content selected on the PC 100. Also, it is further possible to perform load balancing efficiently by selecting an ideal moving image distribution server 200 in accordance with whether or not the content is content for which a distribution screen is generated by rendering processing of at least 2 stages.

Note, in the present embodiment explanation was given having the determination of the server that provides the content be made in accordance with the amount of communication delay with the server and the real-time nature required for the content, but working of the present invention is not limited to this. For example, an arrangement may be made in which the moving image distribution server 200 is determined further combining composite conditions such as performing of refinement in accordance with a geographic position of the server and the client device that transmitted the content provision request.

The present invention is not limited to the above described embodiments, and various changes and variations are possible without deviating from the essence and the scope of the present invention. Accordingly, the following claims are attached in order to make public the scope of the present invention.

What is claimed is:

1. A moving image distribution server, comprising:
   an acquirer which is able to sequentially acquire viewpoint information to determine a screen to be rendered;
   a renderer which is able to render a distribution screen by rendering processing in at least two stages using the viewpoint information acquired by said acquirer, wherein said renderer generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value maps;
   a divider which is able to acquire the Depth map of the intermediate value maps generated for a first screen and divide the Depth map into a plurality of blocks during execution of the rendering processing of the subsequent stage for the first screen;
   a specifier which is able to specify, for each of the plurality of blocks, a corresponding region which corresponds to a block on a Depth map generated for a second screen rendered before the first screen;
   a coder which is able to generate, after an end of the rendering processing of the subsequent stage for the first screen, coded moving image data by coding the first screen, wherein for a block, out of the plurality of blocks, whose similarity to the corresponding region specified by said specifier is not less than a threshold, said coder performs inter-frame coding between an image of the block of the first screen and an image of the corresponding region of the second screen, and for a block, out of the plurality of blocks, whose similarity to the corresponding region specified by said specifier is less than the threshold, said coder performs intra-frame coding of the image of the block of the first screen; and
   a transmitter which is able to send data to an external device,
   wherein said transmitter:
   sends, for the block whose similarity to the corresponding region is not less than the threshold, information which specifies the block and three-dimensional vectors which are used for specifying the corresponding region for the block to the external device before said coder completes generation of the coded moving image data of each block of the first screen as specifying information; and
   sends the coded moving image data to the external device after said coder has completed generation of the coded moving image data of each block of the first screen.

2. The server according to claim 1, wherein said specifier comprises:
   a first calculator which is able to calculate, for each block of the plurality of blocks, three-dimensional coordinates of a rendering object rendered at a vertex of the block based on first viewpoint information used for rendering the first screen and the Depth map generated for the first screen; and
   a transformer which is able to transform, for each of the plurality of blocks, the three-dimensional coordinates calculated by said first calculator into screen coordinates on the second screen using second viewpoint information used for rendering the second screen and specifying the corresponding region.

3. The server according to claim 1, wherein the three-dimensional vectors are motion vectors of the block of the first screen from the corresponding region for the block of the second screen.

4. The server according to claim 1, wherein said specifier specifies the corresponding region for each of the plurality of blocks by specifying three-dimensional coordinates of objects which are rendered in each of the plurality of blocks and by transforming the three-dimensional coordinates to positions on the Depth map of the second screen.

5. The server according to claim 4, wherein the objects which are specified by the three-dimensional coordinates are rendered on four corners of each of the plurality of blocks.

6. The server according to claim 5, wherein said specifier specifies the three-dimensional coordinates of the objects which are rendered on the four corners of each of the plurality of blocks based on Depth values of the four corners on the Depth map of the first screen, viewpoint information for the first screen, and directions to the objects which are rendered on the four corners.

7. The server according to claim 6, wherein said specifier transforms the specified the three-dimensional coordinates to the positions on the Depth map of the second screen based on the three-dimensional coordinates and viewpoint information corresponding to the second screen.

8. A control method of a moving image distribution server, comprising:
   causing an acquirer of the moving image distribution server to sequentially acquire viewpoint information to determine a screen to be rendered;
   causing a renderer of the moving image distribution server to render a distribution screen by rendering processing in at least two stages using the viewpoint information acquired by the acquirer, wherein the renderer generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value maps;
   causing a divider of the moving image distribution server to acquire and divide into a plurality of blocks, during execution of the rendering processing of the subsequent stage for a first screen, the Depth map out of the intermediate value maps generated for the first screen;

causing a specifier of the moving image distribution server to specify, for each of the plurality of blocks, a corresponding region which corresponds to a block on a Depth map generated for a second screen rendered before the first screen;

causing a coder of the moving image distribution server to generate, after an end of the rendering processing of the subsequent stage for the first screen, coded moving image data by coding the first screen, wherein for a block, out of the plurality of blocks, whose similarity to the corresponding region specified by the specifier is not less than a threshold, the coder performs inter-frame coding between an image of the block of the first screen and an image of the corresponding region of the second screen, and for a block, out of the plurality of blocks, whose similarity to the corresponding region specified by the specifier is less than the threshold, the coder performs intra-frame coding of the image of the block of the first screen; and causing a transmitter of the moving image distribution server to send data to an external device, wherein in sending the data to the external device, the transmitter sends, for the block whose similarity to the corresponding region is not less than the threshold, information which specifies the block and three-dimensional vectors which are used for specifying the corresponding region for the block to the external device before generation of the coded moving image data of each block of the first screen is completed by the coder as specifying information, and sends the coded moving image data to the external device after generation of the coded moving image data of each block of the first screen is completed by the coder.

9. A non-transitory computer-readable recording medium that records a program for causing a computer to function as a moving image distribution server, the moving distribution image server comprising:

an acquirer which is able to sequentially acquire viewpoint information to determine a screen to be rendered;

a renderer which is able to render a distribution screen by rendering processing in at least two stages using the viewpoint information acquired by said acquirer, wherein said renderer generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value maps;

a divider which is able to acquire the Depth map of the intermediate value maps generated for a first screen and divide the Depth map into a plurality of blocks during execution of the rendering processing of the subsequent stage for the first screen;

a specifier which is able to specify, for each of the plurality of blocks, a corresponding region which corresponds to a block on a Depth map generated for a second screen rendered before the first screen;

a coder which is able to generate, after an end of the rendering processing of the subsequent stage for the first screen, coded moving image data by coding the first screen, wherein for a block, out of the plurality of blocks, whose similarity to the corresponding region specified by said specifier is not less than a threshold, said coder performs inter-frame coding between an image of the block of the first screen and an image of the corresponding region of the second screen, and for a block, out of the plurality of blocks, whose similarity to the corresponding region specified by said specifier is less than the threshold, said coder performs intra-frame coding of the image of the block of the first screen; and a transmitter which is able to send data to an external device, wherein said transmitter:

sends, for the block whose similarity to the corresponding region is not less than the threshold, information which specifies the block and three-dimensional vectors which are used for specifying the corresponding region for the block to the external device before said coder completes generation of the coded moving image data of each block of the first screen as specifying information; and sends the coded moving image data to the external device after said coder has completed generation of the coded moving image data of each block of the first screen.

10. A moving image distribution system having a moving image distribution server that transmits coded moving image data into which a distribution screen of one frame that was rendered was coded and a moving image reproduction apparatus that sequentially acquires, decodes and reproduces the coded moving image data, wherein the moving image distribution server comprises:

an acquirer which is able to sequentially acquire viewpoint information to determine a screen to be rendered;

a renderer which is able to render the distribution screen by rendering processing in at least two stages using the viewpoint information acquired by said acquirer, wherein the renderer generates, in rendering processing of a preceding stage, intermediate value maps of specific channels including a Depth map to be referred to in rendering processing of a subsequent stage, and renders, in the rendering processing of the subsequent stage, the distribution screen by referring to the intermediate value maps;

a divider which is able to acquire out of the intermediate value maps, and divide into a plurality of blocks, the Depth map, which was generated for a first screen, during execution of the rendering processing of the subsequent stage for the first screen;

a specifier which is able to specify, for each of the plurality of blocks, a corresponding region which corresponds to a block in a Depth map of a second screen rendered before the first screen;

a coder which is able to generate, after an end of the rendering processing of the subsequent stage for the first screen, first coded moving image data by performing, for a block, out of the plurality of blocks, whose similarity to the corresponding region specified by said specifier is not less than a threshold, inter-frame coding between an image of the block of the first screen and an image of the corresponding region of the second screen and performing, for a block, out of the plurality of blocks, whose similarity to the corresponding region specified by said specifier is less than the threshold, intra-frame coding of the image of the block of the first screen; and a transmitter which is able to send data to the moving image reproduction apparatus, wherein the moving image reproduction apparatus comprises:

a first receiver which is able to receive a block for which inter-frame coding has been performed and specific information for specifying reference data to be used for decoding the block for the first coded moving image data;

a decoding preprocessor which is able to generate, from the second screen obtained by decoding second coded moving image data acquired from the moving image distribution server before the first coded moving image data, the reference data to be used for decoding the first coded moving image data for each block for which the inter-frame coding was performed based on the specific information received by said first receiver;

a second receiver which is able to receive the first coded moving image data from the moving image distribution server after reception of the specific information; and a decoder which is able to decode and reproduce the first coded moving image data received by said second receiver using the reference data generated by said decoding preprocessor for each block for which the inter-frame coding was performed, and wherein the transmitter sends, for the block whose similarity to the corresponding region specified by said specifier is not less than the threshold, information which specifies the block and three-dimensional vectors which are used for specifying the corresponding region for the block to the moving image reproduction apparatus before coding by said coder of each block of the first screen completes as specifying information, and sends the first coded moving image data to the moving image reproduction apparatus after coding by said coder of each block of the first screen completes.

11. The moving image distribution system according to claim 10, wherein the moving image distribution server is capable of generating the distribution screen of a plurality of different types of content, the moving image distribution system includes a plurality of moving image distribution severs and a selection apparatus for determining one of the plurality of moving image distribution servers for transmitting the distribution screen to the moving image reproduction apparatus, the selection apparatus comprises an information receiver which is able to receive information of an amount of communication delay for each of the plurality of moving image distribution servers from the moving image reproduction apparatus and information of specified content that specifies content for which provision is to be requested;

a determiner which is able to determine the one of the plurality of moving image distribution servers based on the information of the specified content and the information of the amount of communication delay; and a transmitter which is able to transmit to the moving image reproduction apparatus information for specifying the one of the plurality of moving image distribution servers determined by said determiner, said determiner determines a moving image distribution server for which an amount of communication delay is smaller than a first threshold when the specified content is content for which it is determined that a required responsiveness is high to be the one of the plurality of moving image distribution servers, and determines a moving image distribution server for which an amount of communication delay is larger than the first threshold when the specified content is not content for which it is determined that the required responsiveness is high to be the one of the plurality of moving image distribution servers, and said first receiver and second receiver receive the specific information or the first coded moving image data from the one of the plurality of moving image distribution servers specified by said transmitter.

12. The moving image distribution system according to claim 11, wherein said determiner, when the specified content is content for which it is determined that the required responsiveness is high, determines a moving image distribution server for which an amount of communication delay is less than the first threshold and greater than the second threshold when the content is such that rendering of the distribution screen is performed by the rendering processing in the at least two stages to be the one of the plurality of moving image distribution servers, and determines a moving image distribution server for which an amount of communication delay is less than the second threshold when the content is not such that the rendering of the distribution screen is performed by the rendering processing in the at least two stages to be the one of the plurality of moving image distribution servers.

* * * * *